US009811942B2

United States Patent
Noshi

(10) Patent No.: US 9,811,942 B2
(45) Date of Patent: Nov. 7, 2017

(54) IMAGE PROCESSING SYSTEM AND METHOD

(71) Applicant: Toshiba Medical Systems Corporation, Otawara-shi (JP)

(72) Inventor: Yasuhiro Noshi, Otawara (JP)

(73) Assignee: Toshiba Medical Systems Corporation, Otawara-shi (JP)

(*) Notice: Subject to any disclaimer, the term of this patent is extended or adjusted under 35 U.S.C. 154(b) by 194 days.

(21) Appl. No.: 14/055,392

(22) Filed: Oct. 16, 2013

(65) Prior Publication Data

US 2014/0043334 A1 Feb. 13, 2014

Related U.S. Application Data

(63) Continuation of application No. PCT/JP2012/060789, filed on Apr. 20, 2012.

(30) Foreign Application Priority Data

Apr. 26, 2011 (JP) ................................. 2011-098548

(51) Int. Cl.
*G06T 15/10* (2011.01)
*G06T 15/08* (2011.01)
*H04N 13/04* (2006.01)

(52) U.S. Cl.
CPC .......... *G06T 15/08* (2013.01); *H04N 13/0445* (2013.01)

(58) Field of Classification Search
None
See application file for complete search history.

(56) References Cited

U.S. PATENT DOCUMENTS

2009/0284584 A1* 11/2009 Wakabayashi et al. ........ 348/44
2011/0235066 A1* 9/2011 Sakuragi ........................ 358/1.6
(Continued)

FOREIGN PATENT DOCUMENTS

FI EP 1890262 A1 * 2/2008 ........... G06T 15/205
JP 2001-149366 A 6/2001
(Continued)

OTHER PUBLICATIONS

Ferre et al. By Maria Ferre, Anna Puig and Dani Tost; "A framework for fusion methods and rendering techniques for multimodal volume data" from Computer Animation and Virtual Worlds 2004; 15: pp. 63-77.*

(Continued)

*Primary Examiner* — Frank Chen
(74) *Attorney, Agent, or Firm* — Oblon, McClelland, Maier & Neustadt, L.L.P.

(57) ABSTRACT

An image processing system according to the present embodiment includes a generating unit and a display controlling unit. The generating unit generates a group of different types of parallax image sets that are to three-dimensionally display an object onto the display surface of the displaying unit, from different types of three-dimensional medical image data generated by performing different types of image processing onto imaging data of the object collected by a medical image diagnosis apparatus. The display controlling unit performs control so that display conditions of the group of different types of parallax image sets are switched in accordance with the switching of the viewpoint position around the object displayed on the display surface and that the group of different types of parallax image sets are superimposed and displayed.

13 Claims, 16 Drawing Sheets

(56) References Cited

U.S. PATENT DOCUMENTS

| | | |
|---|---|---|
| 2011/0242093 A1* | 10/2011 | Jung et al. .................... 345/419 |
| 2012/0019635 A1* | 1/2012 | Jian ................................ 348/54 |
| 2012/0212485 A1* | 8/2012 | Oota et al. .................... 345/419 |

FOREIGN PATENT DOCUMENTS

| | | |
|---|---|---|
| JP | 2005-086414 A | 3/2005 |
| JP | 2006-092201 A | 4/2006 |
| JP | 2010-020487 A | 1/2010 |

OTHER PUBLICATIONS

International Search Report dated Jun. 12, 2012 for PCT/JP2012/060789 filed on Apr. 20, 2012 with English Translation.
International Written Opinion dated Jun. 12, 2012 for PCT/JP2012/060789 filed on Apr. 20, 2012.

* cited by examiner

| VIEWPOINT POSITION | OPACITY | |
|---|---|---|
| | DISPLAY IMAGE 1 | DISPLAY IMAGE 2 |
| 0° TO 70° | 100 % | 0 % |
| 70° TO 110° | TRANSITIONAL PHASE | |
| 110° TO 250° | 0 % | 100 % |
| 250° TO 290° | TRANSITIONAL PHASE | |
| 290° TO 360° | 100 % | 0 % |

| VIEWPOINT POSITION | OPACITY | |
|---|---|---|
| | DISPLAY IMAGE 1 | DISPLAY IMAGE 2 |
| 0° TO 90° | 100 % | 0 % |
| 90° TO 270° | 0 % | 100 % |
| 270° TO 360° | 100 % | 0 % |

| VIEWPOINT POSITION | OPACITY | | PARALLAX ANGLE |
|---|---|---|---|
| | DISPLAY IMAGE 1 | DISPLAY IMAGE 2 | |
| 0° TO 70° | 100 % | 0 % | xxx° INTERVALS |
| 70° TO 110° | TRANSITIONAL PHASE | | TRANSITIONAL PHASE |
| 110° TO 250° | 0 % | 100 % | yyy° INTERVALS |
| 250° TO 290° | TRANSITIONAL PHASE | | TRANSITIONAL PHASE |
| 290° TO 360° | 100 % | 0 % | xxx° INTERVALS |

| VIEWPOINT POSITION | OPACITY | |
|---|---|---|
| | DISPLAY IMAGE 1 | DISPLAY IMAGE 2 |
| 35° | 100 % | 0 % |
| 210° | 0 % | 100 % |

| VIEWPOINT POSITION | DISPLAY TIME LENGTH | OPACITY | |
| --- | --- | --- | --- |
| | | DISPLAY IMAGE 1 | DISPLAY IMAGE 2 |
| 0° TO 70° | 0 TO 5 SEC | 100 % | 0 % |
| 70° TO 110° | 5 TO 10 SEC | TRANSITIONAL PHASE | |
| 110° TO 250° | 10 TO 15 SEC | 0 % | 100 % |
| 250° TO 290° | 15 TO 20 SEC | TRANSITIONAL PHASE | |
| 290° TO 360° | 20 TO 25 SEC | 100 % | 0 % |

FIG.25

| VIEWPOINT POSITION | DISPLAY TIME LENGTH | OPACITY ||
| --- | --- | --- | --- |
| | | DISPLAY IMAGE 1 | DISPLAY IMAGE 2 |
| 37° TO 63° | 0 TO 10 SEC | 100 % | 0 % |
| 63° TO 65°, 200° TO 202° | | TRANSITIONAL PHASE ||
| 202° TO 228° | 10 TO 20 SEC | 0 % | 100 % |
| 228° TO 230°, 35° TO 37° | | TRANSITIONAL PHASE ||

IMAGE PROCESSING SYSTEM AND METHOD

CROSS-REFERENCE TO RELATED APPLICATIONS

This application is a continuation of International Application No. PCT/JP2012/060789, filed on Apr. 20, 2012 which claims the benefit of priority of the prior Japanese Patent Application No. 2011-098548, filed on Apr. 26, 2011; the entire contents of which are incorporated herein by reference.

FIELD

The present invention relates to an image processing system and method.

BACKGROUND

As a medical image diagnosis apparatus such as an X-ray computed tomography (CT) apparatus, a magnetic resonance imaging (MRI) apparatus, and an ultrasound diagnosis apparatus, an apparatus that can create three-dimensional medical image data (hereinafter, "volume data") has been in practical use. Such a medical image diagnosis apparatus collects imaging data by taking images of a target object, and generates volume data by performing image processing onto the collected imaging data. Furthermore, the medical image diagnosis apparatus performs volume rendering onto the generated volume data and thereby generates a display image to display on the monitor.

On the other hand, a monitor that allows stereoscopic viewing of a two-viewpoint parallax image taken from two different viewpoints with a special device such as a stereopsis glasses has been brought into practical use. Moreover, a monitor that allows stereoscopic viewing of a multi-viewpoint parallax image taken from multiple viewpoints (e.g., nine-viewpoint parallax image) by use of a light beam controller such as a lenticular lens with the naked eye has also been into practical use. The two-viewpoint parallax image or nine-viewpoint parallax image displayed on a stereoscopic viewing monitor may be generated by estimating the depth information of an image taken from a single viewpoint and performing image processing based on the estimated information.

Patent Literature 1: Japanese Patent Application Laid-open No. 2005-86414

BRIEF DESCRIPTION OF THE DRAWINGS

FIG. 25 is a diagram for explaining the display conditions according to another embodiment.

DETAILED DESCRIPTION

An image processing system according to the present embodiment includes a generating unit and a display controlling unit. The generating unit generates a group of different types of parallax image sets that are to three-dimensionally display an object onto the display surface of the displaying unit, from different types of three-dimensional medical image data generated by performing different types of image processing onto imaging data of the object collected by a medical image diagnosis apparatus. The display controlling unit performs control so that display conditions of the group of different types of parallax image sets are switched in accordance with the switching of the viewpoint position around the object displayed on the display surface and that the group of different types of parallax image sets are superimposed and displayed.

The image processing system and method according to the present embodiments are explained in detail below with reference to the attached drawings. The terms used in the embodiments below are explained now. A "parallax image set" is a group of images that are generated by performing a volume rendering process on volume data while shifting positions of the viewpoints by a predetermined parallax angle. In other words, a "parallax image set" consists of multiple "parallax images" having different "viewpoint positions". Furthermore, a "parallax angle" is an angle that is defined by two adjacent ones of the viewpoint positions arranged to create a "parallax image set" and a position predetermined in the space represented by the volume data (the center of the space, for example). Furthermore, the "number of parallactic viewpoints" is the number of "parallax images" that are required for stereoscopic viewing on a stereoscopic monitor. In the following description, the "nine-viewpoint parallax image" is a "parallax image set" that includes nine "parallax images". Moreover, the "two-viewpoint parallax image" in the following description is a "parallax image set" that includes two "parallax images".

First Embodiment

Figure 1:
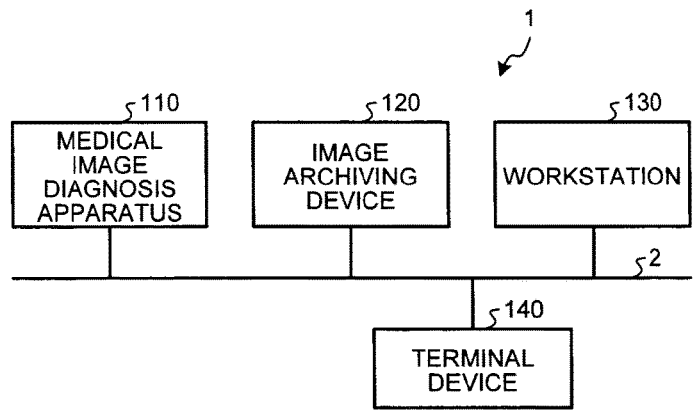
FIG. 1 is a diagram for explaining an example structure of an image processing system according to the first embodiment.

First, an example structure of the image processing system according to the first embodiment is explained. FIG. 1 is a diagram for explaining an example structure of the image processing system according to the first embodiment.

As shown in FIG. 1, an image processing system 1 according to the first embodiment includes a medical image diagnosis apparatus 110, an image archiving device 120, a workstation 130, and a terminal device 140. The devices illustrated in FIG. 1 are intercommunicable directly or indirectly by way of an in-house local area network (LAN) 2 installed in a hospital, for example. For example, if a picture archiving and communication system (PACS) is introduced to the image processing system 1, the devices transmit and receive medical images or the like with one another in consonance with the Digital Imaging and Communications in Medicine (DICOM) standard.

The image processing system 1 creates a parallax image set as a display image from the volume data that is three-dimensional medical image data collected by the medical image diagnosis apparatus 110, displays this parallax image set on a stereoscopic viewing monitor, and thereby presents a stereoscopic medical image to doctors and laboratory technicians who work for the hospital. More specifically, according to the first embodiment, the medical image diagnosis apparatus 110 performs various imaging processes onto the volume data, and creates a parallax image set. Moreover, the medical image diagnosis apparatus 110, the workstation 130, and the terminal device 140 are provided with a stereoscopic viewing monitor, and display the parallax image set created by the medical image diagnosis apparatus 110 onto this monitor. Moreover, the image archiving device 120 stores therein the volume data and the parallax image sets generated by the medical image diagnosis apparatus 110. In other words, the workstation 130 and the terminal device 140 obtain a parallax image set from this image archiving device 120 to process or display on the monitor. These devices are individually explained below.

The medical image diagnosis apparatus 110 may be an X-ray diagnosis apparatus, an X-ray computed tomography (CT) apparatus, a magnetic resonance imaging (MRI) apparatus, an ultrasound diagnosis apparatus, a single photon emission computed tomography (SPECT) apparatus, a positron emission computed tomography (PET) apparatus, a SPECT-CT apparatus in which a SPECT apparatus and an X-ray CT apparatus are combined, a PET-CT apparatus in which a PET apparatus and an X-ray CT apparatus are combined, or a group of the above. Moreover, the medical image diagnosis apparatus 110 according to the first embodiment can generate three-dimensional medical image data (volume data).

More specifically, the medical image diagnosis apparatus 110 according to the first embodiment takes images of a patient to generate volume data. For example, the medical image diagnosis apparatus 110 collects imaging data such as projection data and MR signals by taking images of the patient, reconstructs medical image data of multiple axial planes that run along the patient's body axis from the collected imaging data, and thereby generates volume data. For example, the medical image diagnosis apparatus 110 reconstructs medical image data of 500 axial planes. The group of medical image data of these 500 axial planes forms the volume data. The projection data or MR signals of the patient subjected to the imaging by the medical image diagnosis apparatus 110 may be used as the volume data.

Furthermore, the medical image diagnosis apparatus 110 according to the first embodiment performs various rendering processes onto the generated volume data, and thereby creates a parallax image set.

Moreover, the medical image diagnosis apparatus 110 according to the first embodiment includes a stereoscopic viewing monitor (herein, "stereoscopic displaying monitor") as a displaying unit. The medical image diagnosis apparatus 110 creates a parallax image set and displays the created parallax image set onto the stereoscopic displaying monitor. As a result, the operator of the medical image diagnosis apparatus 110 can perform operations for creating the parallax image set while checking the stereoscopic medical images that are displayed onto the stereoscopic displaying monitor.

Moreover, the medical image diagnosis apparatus 110 transmits the generated volume data and parallax image set to the image archiving device 120. When transmitting the volume data and the parallax image set to the image archiving device 120, the medical image diagnosis apparatus 110 transmits, for example, a patient ID for identifying the patient, an examination ID for identifying an examination, an apparatus ID for identifying the medical image diagnosis apparatus 110, a series ID for identifying a shot taken by the medical image diagnosis apparatus 110, and the like, as attendant information. In addition, as the attendant information transmitted in the transmission of the parallax image set to the image archiving device 120, the attendant information in relation to the parallax image set may be included. The attendant information in relation to the parallax image set may be the number of parallax images (e.g., "9") and the resolution of the parallax images (e.g., "466×350 pixels").

The image archiving device 120 is a database that stores therein medical images. More specifically, the image archiving device 120 according to the first embodiment enters and stores the volume data and the parallax image set transmitted from the medical image diagnosis apparatus 110 into the storage unit. According to the first embodiment, the workstation 130 that has enough capacity for massive images may be adopted so that the workstation 130 and the image archiving device 120 illustrated in FIG. 1 can be integrated. In other words, according to the first embodiment, the volume data and the parallax image set may be stored in the workstation 130 itself.

According to the first embodiment, the volume data and the parallax image set stored in the image archiving device 120 are associated with a patient ID, an examination ID, an apparatus ID, a series ID, and the like. Thus, the workstation 130 and the terminal device 140 retrieve a desired item of volume data or a desired parallax image set from the image archiving device 120, by conducting a search based on the patient ID, the examination ID, the apparatus ID, the series ID, and the like.

The workstation 130 is an image processing device that performs image processing onto the medical image. More specifically, the workstation 130 according to the first embodiment also obtains the parallax image set from the image archiving device 120, and displays the obtained parallax image set onto the stereoscopic displaying monitor. As a result, the doctor or the laboratory technician who is a viewer can look at stereoscopic medical images. According to the first embodiment, the medical image diagnosis apparatus 110 performs the process up to the creation of a parallax image set, but the workstation 130 according to the first embodiment, for example, may also retrieve the volume data from the image archiving device 120, perform various rendering processes onto the retrieved volume data, and thereby create a parallax image set.

The terminal device 140 is a device that allows the doctors and the laboratory technicians working in the hospital to view the medical images. For example, the terminal device 140 is a personal computer (PC), a tablet PC, a personal digital assistant (PDA), a cellular phone, or the like that is operated by a doctor or a laboratory technician working in the hospital. More specifically, the terminal device 140 according to the first embodiment includes a stereoscopic displaying monitor as a displaying unit. Moreover, the terminal device 140 retrieves a parallax image set from the image archiving device 120 and displays the retrieved parallax image set onto the stereoscopic displaying monitor. As a result, the doctor or the laboratory technician who is a viewer can view a stereoscopic medical image.

The stereoscopic displaying monitor included in the medical image diagnosis apparatus 110, the workstation 130, or the terminal device 140 is now explained. A general-purpose monitor that is currently in wide use is designed to two-dimensionally display a two-dimensional image so that it cannot stereoscopically display a two-dimensional image. If the viewer desires stereoscopic vision on the general-purpose monitor, the device that outputs an image to the general-purpose monitor needs to display two-viewpoint parallax images in parallel by a parallel viewing method or a cross viewing method in such a manner that the viewer can have stereoscopic vision. Alternatively, the device that outputs an image onto the general-purpose monitor needs to display an image by a filter viewing method in such a manner that the viewer can have stereoscopic vision by use of, for example, a pair of glasses with red cellophane attached on the left-eye portion and blue cellophane attached on the right-eye portion.

On the other hand, as a stereoscopic displaying monitor, there is a type that realizes stereoscopic vision of a two-viewpoint parallax image (also referred to as a binocular parallax image) by using a special device such as stereoscopic glasses.

Figure 2A:
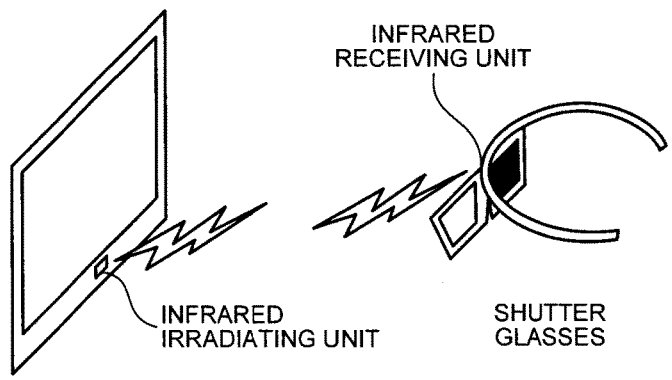
FIG. 2A is a diagram for explaining an example of a stereoscopic displaying monitor that realizes stereoscopic displaying by using a two-viewpoint parallax image.
Figure 2B:
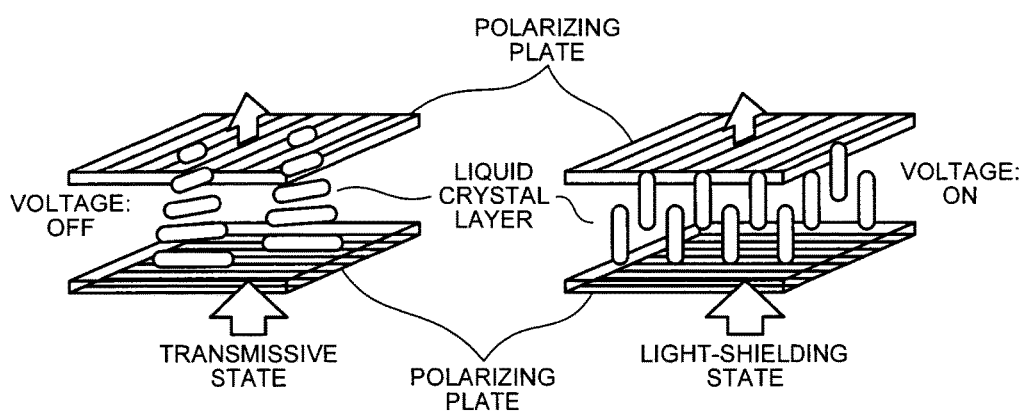
FIG. 2B is a diagram for explaining an example of a stereoscopic displaying monitor that realizes stereoscopic display by using a two-viewpoint parallax image.

FIGS. 2A and 2B are diagrams for explaining an example of a stereoscopic displaying monitor that realizes stereoscopic display of two-viewpoint parallax images. The example illustrated in FIGS. 2A and 2B incorporates a stereoscopic displaying monitor that realizes stereoscopic display by a shutter method, and a pair of shutter glasses is used as stereoscopic glasses which the viewer of the monitor wears. This stereoscopic displaying monitor alternately outputs two-viewpoint parallax images onto the monitor. For example, the monitor illustrated in FIG. 2A alternately outputs a left-eye image and a right-eye image at 120 hertz. Here, the monitor is provided with an infrared irradiating unit as shown in FIG. 2A, and the infrared irradiating unit controls the infrared irradiation at the timing of switching images.

Further, the infrared output by the infrared irradiating unit is received by an infrared receiving unit of the shutter glasses illustrated in FIG. 2A. A shutter is attached to each of the left and ride sides of the rim of the shutter glasses so that the shutter glasses can switch each of the left and right shutters between the transmissive state and the light shielding state at the timing for the infrared receiving unit to receive the infrared light. The process of switching between the transmissive state and the light shielding state of the shutters is explained below.

Each shutter includes, as shown in FIG. 2B, an incident-side polarizing plate and an outgoing-side polarizing plate, and further includes a liquid crystal layer between the incident-side polarizing plate and the outgoing-side polarizing plate. Moreover, the incident-side polarizing plate and the outgoing-side polarizing plate are arranged orthogonal to each other, as shown in FIG. 2B. Here, as shown in FIG. 2B, in the "OFF" state with no voltage applied, the light that passes through the incident-side polarizing plate is turned 90 degrees under the action of the liquid crystal layer, and passes through the outgoing-side polarizing plate. In other words, the shutter with no voltage applied is in a transmissive state.

On the other hand, as shown in FIG. 2B, in the "ON" state with a voltage applied, the polarization rotation effect of the liquid crystal molecules in the liquid crystal layer disappears, and thus the light that passes through the incident-side polarizing plate is blocked by the outgoing-side polarizing plate. In other words, the voltage-applied shutter is put into a light-shielding state.

For this reason, the infrared irradiating unit radiates infrared light, for example, when a left-eye image is being displayed on the monitor. Then, the infrared receiving unit does not apply any voltage onto the left-eye shutter when the infrared light is being received, but applies a voltage onto the right-eye shutter. In this manner, as shown in FIG. 2A, the right-eye shutter is brought into the light shielding state, while the left-eye shutter is brought into the transmissive state, and thus the left-eye image enters the viewer's left eye. On the other hand, the infrared irradiating unit stops the infrared radiation when a right-eye image is being displayed on the monitor. Then, the infrared receiving unit does not apply any voltage onto the right-eye shutter when no infrared light is received, and applies a voltage onto the left-eye shutter. In this manner, the left-eye shutter is put into the light-shielding state, while the right-eye shutter is put into the transmissive state, and therefore the right-eye image is projected onto the viewer's right eye. Thus, the stereoscopic displaying monitor shown in FIGS. 2A and 2B displays an image that the viewer can view stereoscopically, by switching the images displayed on the monitor and the shutter states in step with each other. As a stereoscopic displaying monitor that can present a two-viewpoint parallax image in a stereoscopic manner, a monitor that adopts the polarization eyeglasses system in place of the above shutter system has also been known.

Furthermore, as a stereoscopic displaying monitor that has recently been brought into practical use, there is a type that uses a light beam controller such as a lenticular lens to present, for example, nine-viewpoint parallax images or other multi-parallax images in such a manner that the viewer can have a stereoscopic view with the naked eye. Such a stereoscopic displaying monitor realizes stereoscopy using binocular parallax, and further realizes stereoscopy using motion parallax that is changes of a viewed image in accordance with the viewer's moving viewpoint.

Figure 3:
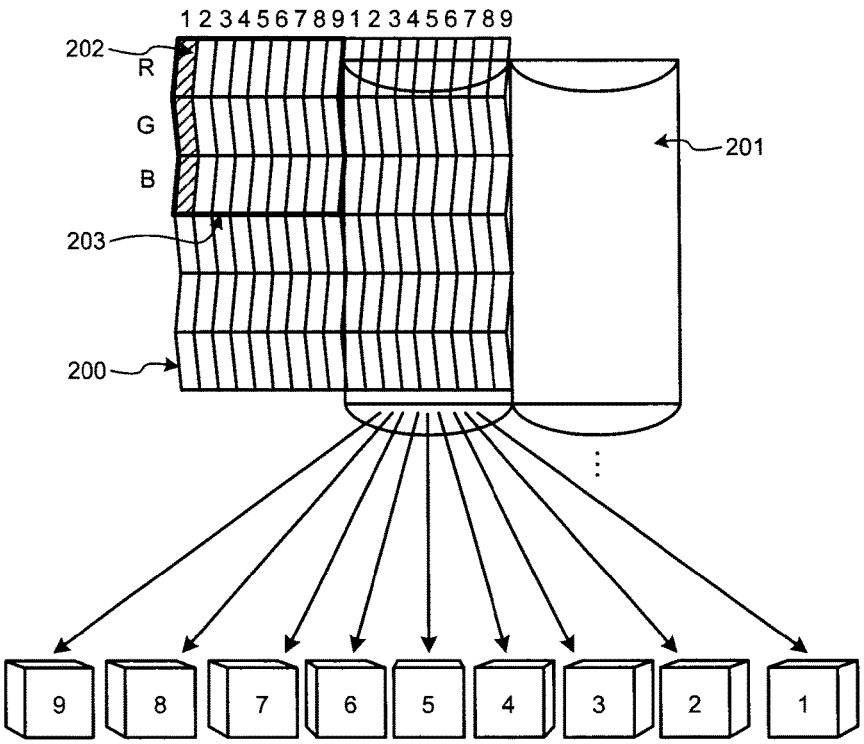
FIG. 3 is a diagram for explaining an example of a stereoscopic displaying monitor that realizes stereoscopic displaying by using a nine-viewpoint parallax image.

FIG. 3 is a diagram for explaining an example of a stereoscopic displaying monitor that presents stereoscopic display using nine-viewpoint parallax images. In the stereoscopic displaying monitor illustrated in FIG. 3, a light beam controller is arranged in front of a flat display surface 200 such as a liquid crystal panel. For example, in the stereoscopic displaying monitor of FIG. 3, a vertical lenticular sheet 201 having an optical opening that extends in a vertical direction is attached to the front surface of the display surface 200, as a light beam controller. In the example of FIG. 3, the vertical lenticular sheet 201 is attached with its convex portion in front, but the vertical lenticular sheet 201 may be attached with its convex portion facing the display surface 200 instead.

On the display surface 200, as illustrated in FIG. 3, pixels 202 that each include three sub-pixels of an length-to-width ratio of 3:1, red (R), green (G), and blue (B) in vertical direction are arranged in a matrix. The stereoscopic displaying monitor illustrated in FIG. 3 converts a nine-viewpoint parallax image that contains nine images into an intermediate image arranged in a specific format (e.g., in a grid form), and then outputs the intermediate image to the display surface 200. In other words, the stereoscopic displaying monitor of FIG. 3 outputs nine pixels at the same position in the nine-viewpoint parallax images each assigned into the pixels 202 of nine columns. The nine-column pixels 202 serve as a unit pixel group 203 that simultaneously displays nine images having different viewpoint positions.

The nine-viewpoint parallax images that are simultaneously output as the unit pixel group 203 onto the display surface 200 are projected as parallel light beams, for example, by a light emitting diode (LED) backlight, and further radiated in multiple directions by the vertical lenticular sheet 201. The light of the pixels of the nine-viewpoint parallax images is radiated in different directions, and thus the light projected onto the right and left eyes of the viewer differ in accordance with the viewer's position (position of the viewpoint). In other words, the parallax image projected onto the right eye and the parallax image projected onto the left eye have different parallax angles in accordance with the viewer's viewing angle. In this manner, the viewer can have stereoscopic view of an imaging target, for example, at each of the nine positions indicated in FIG. 3. Moreover, the viewer can have stereoscopic view of the imaging target directly from the front, for example, at position "5" of FIG. 3, while at any position other than "5" in FIG. 3, the viewer can have stereoscopic view of the imaging target with its orientation varied. The stereoscopic displaying monitor of FIG. 3 is a mere example. The stereoscopic displaying monitor that displays nine-viewpoint parallax images may be liquid crystal having horizontal stripes of "RRR . . . , GGG . . . , BBB . . . " as illustrated in FIG. 3, or may be liquid crystal having vertical stripes of "RGBRGB . . . ". Furthermore, the stereoscopic displaying monitor of FIG. 3 may be of a vertical lens system, as illustrated in FIG. 3, in which the lenticular sheet extends in a vertical direction, or of an oblique lens system in which the lenticular sheet obliquely extends.

The example structure of the image processing system 1 according to the first embodiment has been briefly explained. The above image processing system 1 should not be limited only to the one in which the PACS is introduced. For example, the image processing system 1 is equally applicable when an electronic chart with medical images attached is introduced thereto. In this case, the image archiving device 120 is a database that stores therein electronic charts. Furthermore, the image processing system 1 is equally applicable when, for example, a hospital information system (HIS) or a radiology information system (RIS) is introduced thereto. Moreover, the image processing system 1 is not limited to the above example structure. The functions and assignment of the functions of the devices may be suitably changed in accordance with the mode of the operation.

Figure 4:
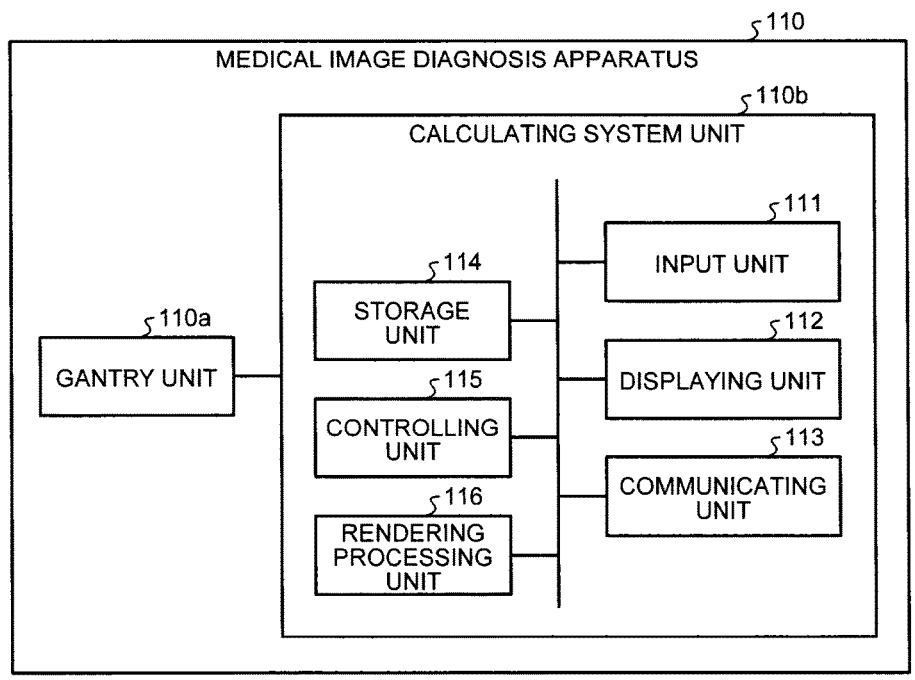
FIG. 4 is a diagram for explaining an example structure of a medical image diagnosis apparatus according to the first embodiment.

Next, an example structure of the medical image diagnosis apparatus 110 according to the first embodiment is explained with reference to FIG. 4. FIG. 4 is a diagram for explaining an example structure of the medical image diagnosis apparatus 110 according to the first embodiment.

The medical image diagnosis apparatus 110 according to the first embodiment includes a gantry unit 110a and a calculating system unit 110b, as illustrated in FIG. 4. The gantry unit 110a includes units that are used for imaging. For example, when the medical image diagnosis apparatus 110 is an X-ray CT apparatus, the gantry unit 110a includes an X-ray tube, a detector, a rotating arm, a bed, and the like. On the other hand, the calculating system unit 110b includes an input unit 111, a displaying unit 112, a communicating unit 113, a storage unit 114, a controlling unit 115, and a rendering processing unit 116.

The input unit 111 may be a mouse, a keyboard, a trackball, and the like, and it receives input of various operations performed onto the medical image diagnosis apparatus 110 from the operator. More specifically, the input unit 111 according to the first embodiment receives input of a plan for imaging, an imaging instruction, conditions regarding the rendering process (hereinafter, "rendering conditions"), and the like.

The displaying unit 112 is a liquid crystal panel or the like that serves as a stereoscopic displaying monitor, and it displays various kinds of information. More specifically, the displaying unit 112 according to the first embodiment displays a graphical user interface (GUI) for receiving various operations from the operator and a parallax image set as a display image, and the like. The communicating unit 113 is a network interface card (NIC) or the like, and establishes communications with other devices.

The storage unit 114 is a hard disk, a semiconductor memory device, or the like, and stores therein various kinds of information. More specifically, the storage unit 114 according to the first embodiment stores therein imaging data that is collected from imaging. Moreover, the storage unit 114 according to the first embodiment stores therein the volume data generated from the imaging data, the volume data that is being subjected to the rendering process, parallax image set generated in the rendering process, and the like.

The controlling unit 115 is an electronic circuit such as a central processing unit (CPU) and a microprocessing unit (MPU), or an integrated circuit such as an application specific integrated circuit (ASIC) and a field programmable gate array (FPGA), and it performs the control of the entire medical image diagnosis apparatus 110.

For example, the controlling unit 115 according to the first embodiment controls the display of a GUI and a parallax image set on the displaying unit 112. Moreover, for example, the controlling unit 115 controls the imaging that is conducted by controlling the units of the gantry unit 110a and the transmission and reception of the volume data and the parallax image set between the image archiving device 120 and itself by way of the communicating unit 113. In addition, the controlling unit 115 controls, for example, the rendering process performed by the rendering processing unit 116. Still further, for example, the controlling unit 115 controls reading of various kinds of data from the storage unit 114 and the storage into the storage unit 114.

The rendering processing unit 116 performs various rendering processes onto the volume data that is read from the storage unit 114, and generates a parallax image set, under the control of the controlling unit 115. More specifically, the rendering processing unit 116 according to the first embodiment reads the volume data from the storage unit 114, and first performs preprocessing onto this volume data. Next, the rendering processing unit 116 performs a volume rendering process onto the preprocessed volume data, and generates a parallax image set. Thereafter, the rendering processing unit 116 generates a two-dimensional image in which various kinds of information (scales, the name of the patient, examination items, and the like) is described, and superimposes this onto each one of the parallax image set so that a to-be-output two-dimensional image can be generated. Then, the rendering processing unit 116 stores the generated parallax image set and the to-be-output two-dimensional image into the storage unit 114. The rendering process according to the first embodiment indicates the entire imaging process that is executed onto the volume data, and the volume rendering process indicates, of the rendering process, a process of generating a two-dimensional image that reflects the three-dimensional information.

Figure 5:
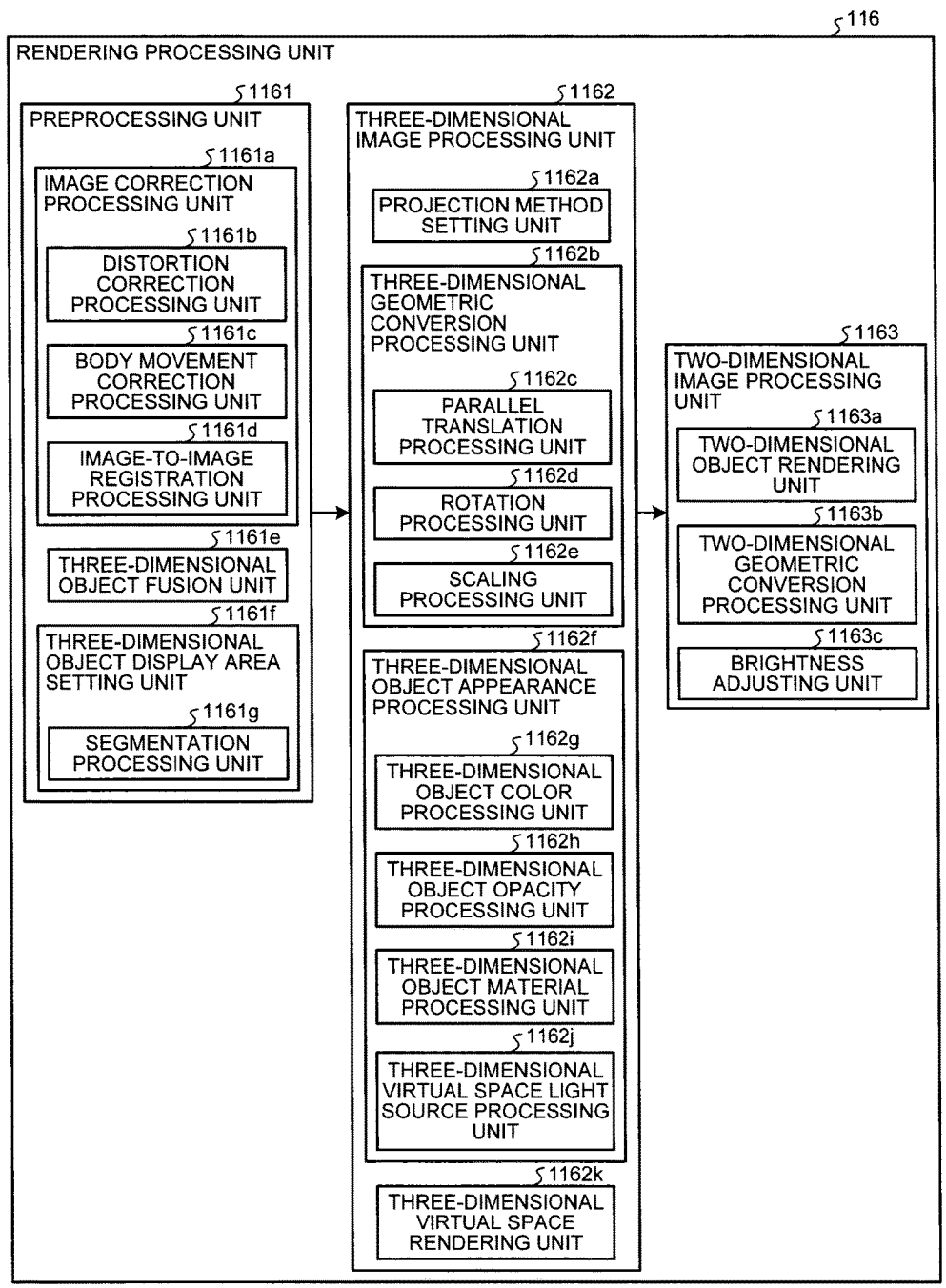
FIG. 5 is a diagram for explaining an example structure of the rendering processing unit illustrated in FIG. 4.

FIG. 5 is a diagram for explaining an example structure of the rendering processing unit shown in FIG. 4. As illustrated in FIG. 5, the rendering processing unit 116 includes a preprocessing unit 1161, a three-dimensional image processing unit 1162, and a two-dimensional image processing unit 1163. The preprocessing unit 1161 performs preprocessing onto the volume data, the three-dimensional image processing unit 1162 generates a parallax image set from the preprocessed volume data, and the two-dimensional image processing unit 1163 generates a to-be-output two-dimensional image that is prepared by superimposing various kinds of information onto the parallax image set. These units are individually explained below.

The preprocessing unit 1161 is a processing unit that performs various kinds of preprocessing onto the volume data before performing a rendering process thereon, and includes an image correction processing unit 1161*a*, a three-dimensional object fusion unit 1161*e*, and a three-dimensional object display area setting unit 1161*f*.

The image correction processing unit 1161*a* is a processing unit that performs an image correction process when two pieces of volume data should be processed as one piece of volume data, and it includes a distortion correction processing unit 1161*b*, a body movement correction processing unit 1161*c*, and an image-to-image registration processing unit 1161*d*, as illustrated in FIG. 5. For example, the image correction processing unit 1161*a* performs an image correcting process when the volume data of a PET image generated by the PET-CT apparatus and the volume data of an X-ray CT image should be processed as one piece of volume data. Moreover, the image correction processing unit 1161*a* performs the image correcting process when the volume data of a T1 weighted image and the volume data of a T2 weighted image generated by the MRI apparatus should be processed as one piece of volume data.

Moreover, the distortion correction processing unit 1161*b* corrects the data distortion in each piece of volume data caused by a collecting condition at the time of data collection by the medical image diagnosis apparatus 110. Moreover, the body movement correction processing unit 1161*c* corrects the shifting caused by the movement of the patient's body during the collection of the data that is used for generating individual pieces of volume data. Further, the image-to-image registration processing unit 1161*d* performs registration between the two pieces of volume data that have been subjected to the correcting processes by the distortion correction processing unit 1161*b* and the body movement correction processing unit 1161*c*, by adopting the cross-correlation, for example.

The three-dimensional object fusion unit 1161*e* performs fusion onto the multiple pieces of volume data that have been subjected to the registration by the image-to-image registration processing unit 1161*d*. If the rendering process is to be performed onto a single piece of volume data, the processes of the image correction processing unit 1161*a* and the three-dimensional object fusion unit 1161*e* are omitted.

The three-dimensional object display area setting unit 1161*f* is a processing unit that determines a display area corresponding to the display target organ designated by the operator, and it includes a segmentation processing unit 1161*g*. The segmentation processing unit 1161*g* is a unit that extracts the organ designated by the operator, such as the heart, lungs, and blood vessels, for example, by region growing method based on the pixel values (voxel values) of the volume data.

If the operator does not designate any display target organ, the segmentation processing unit 1161*g* does not perform the segmentation process. Further, if the operator designates more than one display target organ, the segmentation processing unit 1161*g* extracts the corresponding organs. The process of the segmentation processing unit 1161*g* may be repeated in response to a fine control request from the operator who checks the rendered image.

The three-dimensional image processing unit 1162 performs a volume rendering process onto the volume data that has been preprocessed by the preprocessing unit 1161. As the processing units that perform the volume rendering process, the three-dimensional image processing unit 1162 includes a projection method setting unit 1162*a*, a three-dimensional geometric conversion processing unit 1162*b*, a three-dimensional object appearance processing unit 1162*f*, and a three-dimensional virtual space rendering unit 1162*k*.

The projection method setting unit 1162*a* determines the projection method for generating a parallax image set. For example, the projection method setting unit 1162*a* decides whether the volume rendering process should be executed by parallel projection or by perspective projection.

The three-dimensional geometric conversion processing unit 1162*b* is a processing unit that determines information necessary to conduct three-dimensional geometric conversion onto the volume data that is subjected to the volume rendering process, and it includes a parallel translation processing unit 1162*c*, a rotation processing unit 1162*d*, and a scaling processing unit 1162*e*. The parallel translation processing unit 1162*c* is a processing unit that determines the amount of shifting for shifting the volume data in parallel when the viewpoint position is translated in the volume rendering process, while the rotation processing unit 1162*d* is a processing unit that determines the amount of shifting for rotating the volume data when the viewpoint position is rotated and shifted in the volume rendering process. Furthermore, the scaling processing unit 1162*e* is a processing unit that determines the enlargement ratio or reduction ratio of the volume data when a request of enlarging or reducing the size of the parallax image set is issued.

The three-dimensional object appearance processing unit 1162f includes a three-dimensional object color processing unit 1162g, a three-dimensional object opacity processing unit 1162h, a three-dimensional object material processing unit 1162i, and a three-dimensional virtual space light source processing unit 1162j. With those processing units, the three-dimensional object appearance processing unit 1162f performs a process of determining the display condition of the parallax image set that is to be displayed, in response to the operator's request, for example.

The three-dimensional object color processing unit 1162g is a processing unit that determines colors for coloring each region of the segmented volume data. The three-dimensional object opacity processing unit 1162h is a processing unit that determines the opacity of each voxel that constitutes each region of the segmented volume data. In the volume data, a region behind the region whose opacity is determined as "100%" is not portrayed in the parallax image set. Furthermore, in the volume data, the region whose opacity is determined as "0%" is not portrayed in the parallax image set.

The three-dimensional object material processing unit 1162i is a processing unit that determines the material of each region of the segmented volume data so that the texture of the region that is portrayed can be adjusted. The three-dimensional virtual space light source processing unit 1162j is a processing unit that determines the position of the virtual light source set in the three-dimensional virtual space and the types of the virtual light source when executing the volume rendering process onto the volume data. The types of virtual light source include a light source that radiates parallel light beams from an infinite distance and a light source that radiates light beams from the viewpoint in a radial fashion.

The three-dimensional virtual space rendering unit 1162k performs the volume rendering process onto the volume data to generate a parallax image set. Moreover, to perform the volume rendering process, the three-dimensional virtual space rendering unit 1162k uses various kinds of information determined by the projection method setting unit 1162a, the three-dimensional geometric conversion processing unit 1162b, and the three-dimensional object appearance processing unit 1162f, when necessary.

Here, the volume rendering process performed by the three-dimensional virtual space rendering unit 1162k follows the rendering conditions. For example, a rendering condition may be "parallel projection" or "perspective projection". In addition, another rendering condition may be "reference viewpoint position and parallax angle". Furthermore, rendering conditions may be "parallel shift of the viewpoint position", "rotational shift of the viewpoint position", "enlargement of the parallax image set", "reduction of the parallax image set". Still further, the rendering conditions may be "colors for coloring", "transmissivity", "texture", "position of the virtual light source", and "type of virtual light source". Such rendering conditions may be received from the operator by way of the input unit 111 or may be determined as default settings. In either case, the three-dimensional virtual space rendering unit 1162k receives the rendering conditions from the controlling unit 115, and performs the volume rendering process onto the volume data in accordance with these rendering conditions. Moreover, because the projection method setting unit 1162a, the three-dimensional geometric conversion processing unit 1162b, and the three-dimensional object appearance processing unit 1162f that are mentioned above determine various kinds of necessary information in accordance with these rendering conditions, the three-dimensional virtual space rendering unit 1162k generates the parallax image set by use of the determined pieces of information.

Figure 6:
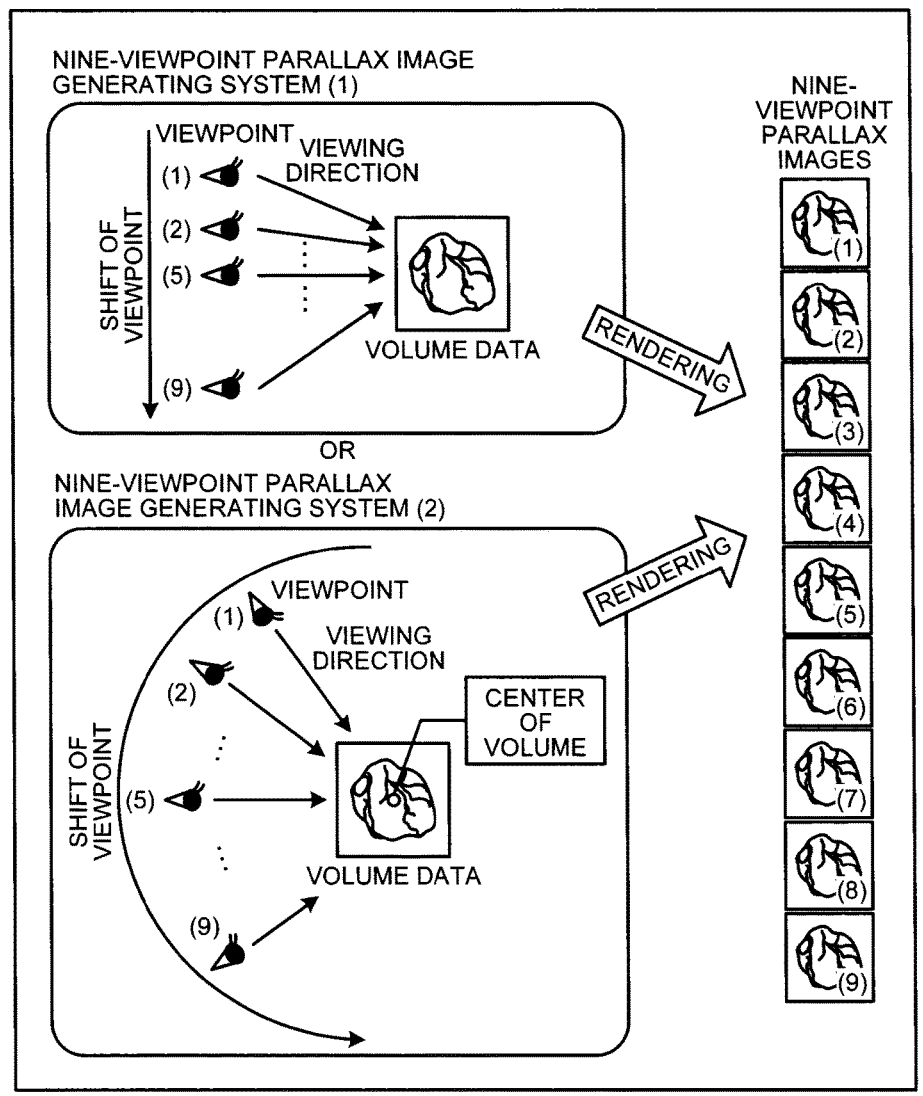
FIG. 6 is a diagram for explaining an example of a volume rendering process according to the first embodiment.

FIG. 6 is a diagram for explaining an example of the volume rendering process according to the first embodiment. For example, as shown in "Nine-viewpoint Parallax Image Generating System (1)" of FIG. 6, the three-dimensional virtual space rendering unit 1162k receives parallel projection, and further receives the reference viewpoint position (5) and a parallax angle "1 degree", as rendering conditions. In such a situation, the three-dimensional virtual space rendering unit 1162k shifts the positions of the viewpoint from (1) to (9) in parallel in such a manner that the parallax angles are determined every "1 degree", and thereby generates nine parallax images having parallax angles (angles between the viewing directions) shifted every 1 degree by using the parallel projection. When performing the parallel projection, the three-dimensional virtual space rendering unit 1162k sets the light source that radiates parallel light beams from an infinite distance along the viewing directions.

Alternatively, as shown in "Nine-viewpoint Parallax Image Generating System (2)" of FIG. 6, the three-dimensional virtual space rendering unit 1162k receives perspective projection, and further receives the reference viewpoint position (5) and the parallax angle "1 degree", as rendering conditions. In such a situation, the three-dimensional virtual space rendering unit 1162k rotates and shifts the position of the viewpoint from (1) to (9) around the center (barycenter) of the volume data in such a manner that the parallax angles are determined every "1 degree", and thereby generates nine parallax images having parallax angles shifted every 1 degree by perspective projection. When performing the perspective projection, the three-dimensional virtual space rendering unit 1162k sets the point light source or the surface light source that radiates light beams in a three-dimensional and radial fashion at each viewpoint, with the viewing direction in the center. Moreover, when performing the perspective projection, the viewpoints (1) to (9) may be shifted in parallel, depending on the rendering conditions.

The three-dimensional virtual space rendering unit 1162k may perform the volume rendering process that adopts both parallel projection and perspective projection, by setting the light source in such a manner that light beams are radiated in a two-dimensional radial fashion with the viewing direction serving as the center with respect to the vertical direction of the to-be-displayed volume rendering image, and also radiated in parallel along the viewing direction from an infinite distance with respect to the horizontal direction of the to-be-displayed volume rendering image.

The nine parallax images generated in this manner are the parallax image set. According to the first embodiment, the nine parallax images are converted, for example, to intermediate image that is arranged in a specific format (e.g., in a matrix form) by the controlling unit 115, and output to the displaying unit 112 that serves as a stereoscopic displaying monitor. Then, the operator of the workstation 130 conducts the operation for generating a parallax image set, while checking the stereoscopic medical image displayed on the stereoscopic displaying monitor.

In the example of FIG. 6, the projection method, the reference viewpoint position, and the parallax angle that are received as rendering conditions have been explained, but when other conditions are received as rendering conditions, the three-dimensional virtual space rendering unit 1162k reflects each of these rendering conditions and generates a parallax image set in the same manner.

Moreover, the three-dimensional virtual space rendering unit 1162k is provided with a function of performing not only the volume rendering but also multi-planar reconstruction (MPR) to reconstruct an MPR image from the volume data. The three-dimensional virtual space rendering unit 1162k is also provided with functions of performing "curved MPR" and "intensity projection".

Thereafter, the parallax image set generated by the three-dimensional image processing unit 1162 from the volume data is used as an underlay. Then, an overlay in which various kinds of information (scales, the name of the patient, the examination item, and the like) are presented is superimposed on the underlay to realize a to-be-output two-dimensional image. The two-dimensional image processing unit 1163 is a processing unit that performs image processing onto the overlay and the underlay to generate a to-be-output two-dimensional image, and it includes a two-dimensional object rendering unit 1163a, a two-dimensional geometric conversion processing unit 1163b, and a brightness adjusting unit 1163c, as illustrated in FIG. 5. For example, the two-dimensional image processing unit 1163 superimposes one overlay onto each of the nine parallax images (underlays) and thereby prepares nine to-be-output two-dimensional images so that the bearing of a burden for the process of generating to-be-output two-dimensional images can be reduced.

The two-dimensional object rendering unit 1163a is a processing unit that renders various kinds of information that is to be presented on the overlay, and the two-dimensional geometric conversion processing unit 1163b is a processing unit that performs a parallel shifting process or a rotation shifting process onto the positions of various kinds of information presented on the overlay, and also performs the enlarging or reducing process of various kinds of information presented on the overlay.

Furthermore, the brightness adjusting unit 1163c is a processing unit that performs a brightness converting process and adjusts, for example, the gradation of the destination stereoscopic displaying monitor, and the brightness of the overlay and the underlay in accordance with the image processing parameters such as the window width (WW) and the window level (WL).

The to-be-output two-dimensional images generated in this manner are stored, for example, temporarily into the storage unit 114 by the controlling unit 115, and then sent to the image archiving device 120 by way of the communicating unit 113. For example, the workstation 130 or the terminal device 140 obtains the to-be-output two-dimensional images from the image archiving device 120, converts the to-be-output two-dimensional images to intermediate image arranged in a specific format (e.g., in matrix form) and displays the intermediate image onto the stereoscopic displaying monitor. Then, the viewer, who is a doctor or a laboratory technician, can check the stereoscopic medical image with various kinds of information (scales, the name of the patient, the examination item, and the like) presented.

Figure 7:
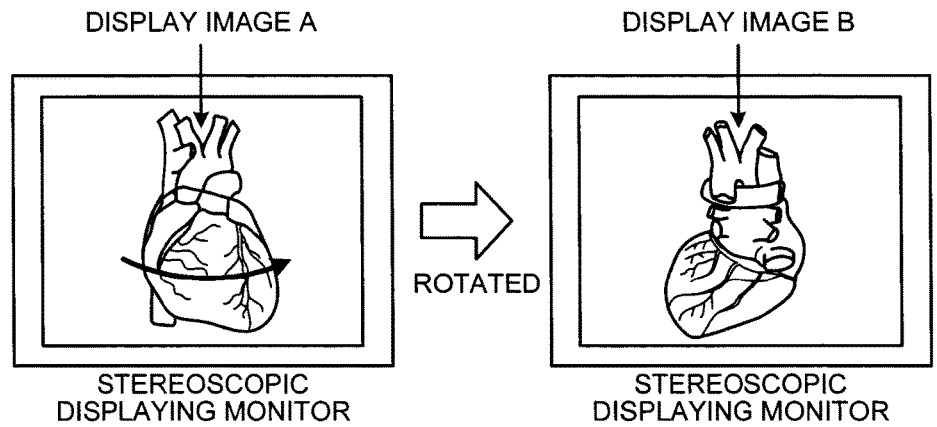
FIG. 7 is a diagram for explaining a displaying method according to the first embodiment.

Here, the medical image diagnosis apparatus 110 according to the first embodiment realizes a method of superimposing and displaying different types of display images having different reconstruction conditions and correction conditions, while switching the display conditions. More specifically, the medical image diagnosis apparatus 110 switches the display conditions in accordance with the switching of the viewpoint positions. FIG. 7 is a diagram for explaining the displaying method according to the first embodiment. As illustrated in FIG. 7, the medical image diagnosis apparatus 110 according to the first embodiment superimposes and displays a display image A and a display image B that have different reconstruction conditions and correction conditions, and also switches the display of the display image A and the display image B by switching their display conditions in accordance with the rotation of the target object (e.g., the heart). This aspect is explained below.

As discussed above, a group of to-be-output two-dimensional images are generated by further superimposing an image that serves as an overlay to display various kinds of information (scales, the name of the patient, the examination item, and the like) onto each one of the parallax image set that serve as underlays. However, in the following description, when a "display image" appears, it may indicate a group of parallax images included in the parallax image set on which various kinds of information are yet to be superimposed, or a group of to-be-output two-dimensional images on which various kinds of information has been superimposed. Furthermore, superimposing of various kinds of information can be arbitrarily changed in accordance with the mode of the operation, and thus the explanation is omitted below.

Figure 8:
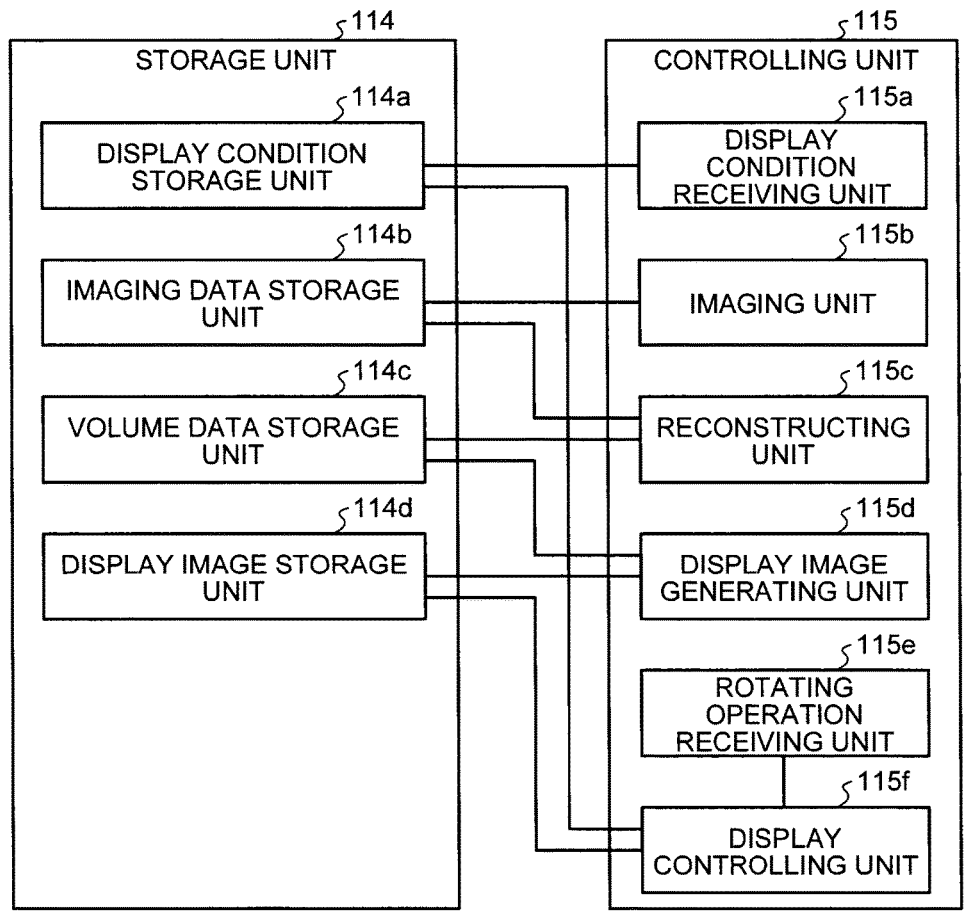
FIG. 8 is a diagram for explaining an example structure of a storage unit and a controlling unit according to the first embodiment.

FIG. 8 is a diagram for explaining an example structure of the storage unit 114 and the controlling unit 115 according to the first embodiment. As indicated in FIG. 8, in the medical image diagnosis apparatus 110 according to the first embodiment, the storage unit 114 includes a display condition storage unit 114a, an imaging data storage unit 114b, a volume data storage unit 114c, and a display image storage unit 114d.

The display condition storage unit 114a stores therein display conditions for switching the display that are entered by a display condition receiving unit 115a described later. Moreover, the display conditions stored in the display condition storage unit 114a are used in the control performed by a display controlling unit 115f that is described later. The display conditions stored in the display condition storage unit 114a will be explained in detail later.

The imaging data storage unit 114b stores therein imaging data that is entered by an imaging unit 115b explained later. Moreover, the imaging data stored in the imaging data storage unit 114b is used in the process performed by a reconstructing unit 115c explained later.

The volume data storage unit 114c stores therein different types of volume data having different reconstruction conditions and correction conditions that are entered by a reconstructing unit 115c explained later. Moreover, different types of volume data stored in the volume data storage unit 114c is used in the process performed by a display image generating unit 115d that is explained later.

The display image storage unit 114d stores therein different types of display images that are entered by the display image generating unit 115d explained later. Moreover, different types of display images stored in the display image storage unit 114d are used in the process performed by the display controlling unit 115f that is explained later.

Next, as indicated in FIG. 8, in the medical image diagnosis apparatus 110 according to the first embodiment, the controlling unit 115 includes the display condition receiving unit 115a, the imaging unit 115b, the reconstructing unit 115c, the display image generating unit 115d, a rotating operation receiving unit 115e, and the display controlling unit 115f.

The display condition receiving unit 115a receives input of the display conditions from the operator by way of the input unit 111, and enters the received display conditions into the display condition storage unit 114a. For example, the display condition receiving unit 115a receives input of those display conditions at the time of planning for imaging. In general, the medical image diagnosis apparatus 110 receives settings of the imaging conditions at the time of planning for imaging, and performs imaging in accordance with these imaging conditions. In other words, it determines in advance what type of imaging is to be performed, what reconstruction conditions and correction conditions are to be used to generate volume data, and the like, at the time of planning for imaging.

For example, that "the imaging target is the heart", "the volume data should be generated by use of reconstruction conditions for evaluating the coronary artery", "separately from this volume data, volume data should be generated by use of correction conditions for removing any artifacts caused by substances having different absorption amounts", and the like are determined in advance. Then, the operator becomes aware of what types of volume data are to be generated as the multiple types of volume data, and thus the display condition receiving unit 115a can receive settings of the display conditions from the operator at the time of planning for imaging. Artifacts caused by substances having different absorption amounts include, for example, artifacts caused by metal such as a stent, a calcified area, and a contrast agent, and also beam hardening artifacts.

Figures 9, 10:
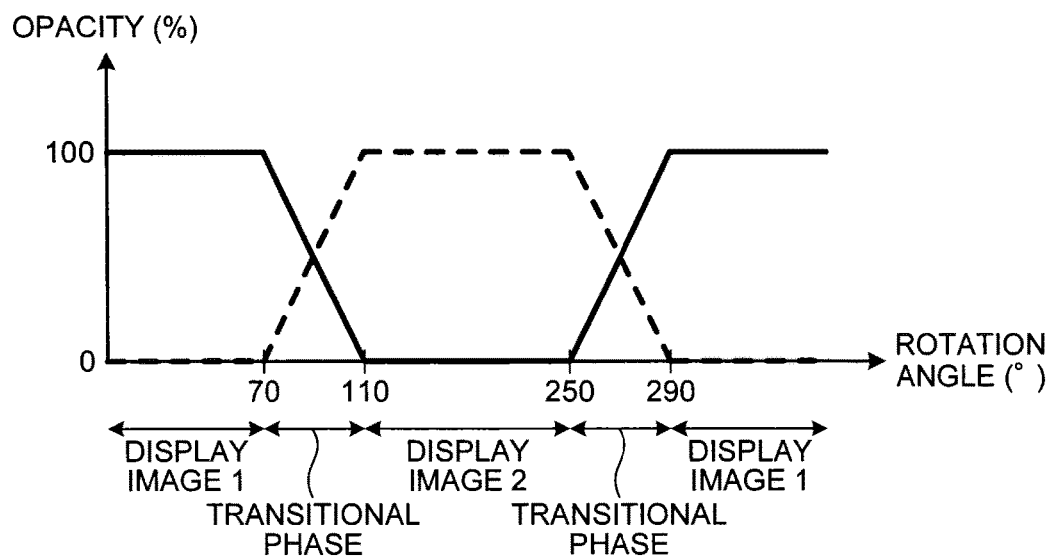
FIG. 9 is a diagram for explaining display conditions according to the first embodiment.
FIG. 10 is a diagram for explaining display conditions according to the first embodiment.

FIGS. 9 and 10 are diagrams for explaining the display conditions according to the first embodiment. FIG. 9 is provided to conceptually explain the display conditions, while FIG. 10 is provided to explain the display conditions corresponding to FIG. 9 as display conditions that are stored in the display condition storage unit 114a.

In FIG. 9, the vertical axis indicates the "opacity" (%) that is the degree of transparency of the display image, while the horizontal axis indicates the "rotation angle" (°) of the object displayed on the display surface of the displaying unit 112. The medical image diagnosis apparatus 110 according to the first embodiment superimposes different types of display images and adjusts the degree of transparency of these display images, and thereby controls the switching and displaying of the different types of display images.

That is, as shown in FIG. 9, when the rotation angle of the object is 'between 0° and 70°', for example, the opacity of the 'display image 1' (indicated by a solid line in FIG. 9) is '100%', while the opacity of the 'display image 2' (indicated by a dashed line in FIG. 9) is '0%'. This means that the 'display image 1' does not allow other images behind the display image 1 to be seen through at all, while the 'display image 2' fully shows any images behind the display image 2. As a result, when the 'display image 1' and the 'display image 2' are superimposed, only the 'display image 1' is displayed on the display surface of the displaying unit 112.

On the other hand, as indicated in FIG. 9, when the rotation angle of the object is 'between 110° and 250°', for example, the opacity of the 'display image 1' (indicated by a solid line in FIG. 9) is '0%', while the opacity of the 'display image 2' (indicated by a dashed line in FIG. 9) is '100%'. This means that the 'display image 1' fully shows the images behind the display image 1, while the 'display image 2' does not allow any images behind the display image 2 to be seen through at all. As a result, when the 'display image 1' and the 'display image 2' are superimposed, only the 'display image 2' is displayed on the display surface of the displaying unit 112.

According to the first embodiment, transitional phases are provided at the time of switching between the 'display image 1' and the 'display image 2', as indicated in FIG. 9. In other words, a transitional phase is set so that the opacity of the 'display image 1' and the 'display image 2' gradually increases or decreases, and this opacity relationship is eventually reversed.

For example, the display condition receiving unit 115a displays, as indicated in FIG. 9, a GUI for editing the display conditions onto the displaying unit 112 to receive operations made onto this GUI, together with a GUI for editing the imaging conditions, and thereby receives the settings of the display conditions from the operation. Then, the display condition storage unit 114a stores the above display conditions into a table as indicated in FIG. 10, for example. Here, according to the first embodiment, the "rotation of the object" means "switching of the viewpoint position around the object". Moreover, the "viewpoint position" is determined in a direction perpendicular to the display surface, and it is assumed that the "viewpoint position" and the "rotation angle of the object" coincide with each other.

Furthermore, for example, the display condition receiving unit 115a may display the GUI as indicated in FIG. 10 on the displaying unit 112 to receive any operation made onto this GUI, and thereby receive the settings of the display conditions from the operation. Still further, for example, the display condition receiving unit 115a may display an interactive GUI onto the displaying unit 112 to receive any operation made onto this GUI, and thereby receive the settings of the display conditions from the operation.

The imaging unit 115b controls the units of the gantry unit 110a in accordance with the preset imaging conditions and thereby performs the imaging. Furthermore, the imaging unit 115b stores the imaging data collected from the imaging into the imaging data storage unit 114b. For example, when the medical image diagnosis apparatus 110 is an X-ray CT apparatus, the imaging unit 115b controls the X-ray tube, the detector, the rotating arm, and the like, in accordance with the preset imaging conditions, collects the projection data, and stores the collected projection data into the imaging data storage unit 114b.

The reconstructing unit 115c reads the imaging data from the imaging data storage unit 114b, and performs the reconstructing process onto the read-out imaging data to generate volume data. Moreover, the reconstructing unit 115c stores the generated volume data into the volume data storage unit 114c.

Here, the "reconstructing process" in a broad sense (hereinafter, "reconstructing process (broad sense)") includes the "reconstructing process" in a narrow sense (hereinafter, "reconstructing process (narrow sense)") and the "correcting process". The reconstructing unit 115c according to the first embodiment performs the reconstructing process (narrow sense) and the correcting process in accordance with the reconstruction conditions determined at the time of, for example, planning for imaging. For example, the reconstructing unit 115c according to the first embodiment performs the reconstructing process (broad sense) by using reconstruction conditions for evaluating the coronary artery and thereby generates the 'volume data 1'. Further, the reconstructing unit 115c performs the reconstructing process (broad sense) by using the correction conditions for removing artifacts caused by substances having different absorption amounts and thereby generates the 'volume data 2'.

Figure 11:
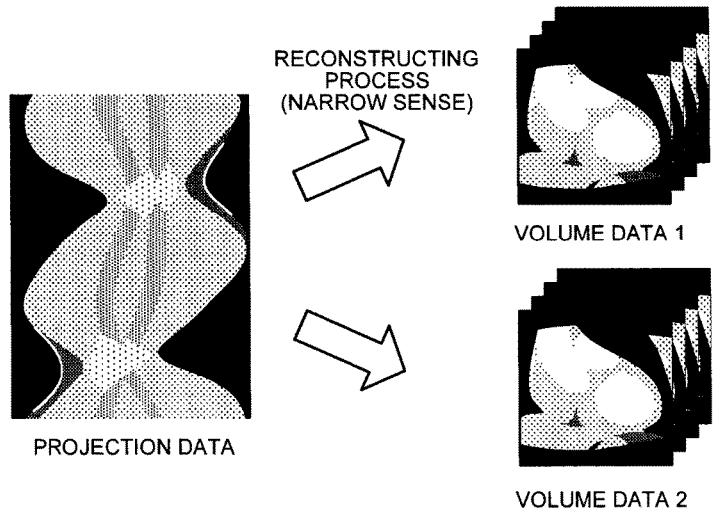
FIG. 11 is a diagram for explaining a reconstructing process (in a broad sense) according to the first embodiment.

FIG. 11 is a diagram for explaining the reconstructing process (broad sense) according to the first embodiment. As illustrated in FIG. 11, the reconstructing unit 115c according to the first embodiment generates different types of 'volume data 1' and 'volume data 2' that have different reconstruction conditions and correction conditions, from a single piece of 'projection data'.

The reason for generating different types of volume data from a single piece of imaging data is explained now. For example, when the object rendered in the volume data is the heart, a request from the viewer who checks the heart displayed on the display surface may be "to conduct a diagnosis of the coronary artery" or "to have a view without the influence of the stent". To generate a display image that suits the former request, the reconstruction conditions used at the time of generating the volume data should be reconstruction conditions for evaluating the coronary artery. On the other hand, to generate a display image that suits the latter request, the correction conditions used at the time of generating the volume data should be correction conditions for removing artifacts caused by a metal. For this reason, different types of volume data are generated from a single piece of imaging data to generate display images that suit different requests.

Conventionally, the medical image diagnosis apparatus generates different types of display images from different types of volume data generated in the above manner, arranges and displays the different types of display images onto the displaying unit, and thereby presents display images that suit different requests to the viewer.

The display image generating unit 115d reads the volume data from the volume data storage unit 114c, the rendering processing unit 116 performs the rendering process onto the read-out volume data to generate different types of display images. Furthermore, the display image generating unit 115d enters the generated display images into the display image storage unit 114d. The "display images" are a group of "to-be-output two-dimensional images" generated, for example, by superimposing a "two-dimensional image" showing various kinds of information (scales, the name of the patient, the examination item, and the like) onto each "parallax image" of the "parallax image set". In other words, a "display image" includes "to-be-output two-dimensional images" prepared by superimposing each "parallax image" and a "two-dimensional image", and the number of two-dimensional images agrees with that of parallactic viewpoints. For the rendering condition, a preset one that is stored or one that is received from the operator can be adopted.

As described above, according to the first embodiment, for example, the volume data storage unit 114c stores therein different types of 'volume data 1' and 'volume data 2' having different reconstruction conditions and correction conditions. For this reason, for example, the display image generating unit 115d reads the 'volume data 1' and the 'volume data 2' from the volume data storage unit 114c, and generates a 'display image 1' from the 'volume data 1', and a 'display image 2' from the 'volume data 2'. According to the first embodiment, the display image generating unit 115d generates 'display images 1' and 'display images 2' corresponding to all the rotation angles (viewpoint positions) in advance and stores the 'display image 1' and the 'display image 2' in the display image storage unit 114d in advance, but the embodiment is not limited thereto. For example, each time the rotating operation receiving unit 115e receives a rotation angle, the display image generating unit 115d may generate a 'display image 1' and a 'display image 2' corresponding to the received rotation angle in real time.

The rotating operation receiving unit 115e receives a rotating operation of an object displayed on the display surface from the operator by way of the input unit 111, and notifies the display controlling unit 115f of the received rotating operation. For example, the rotating operation receiving unit 115e receives a rotating operation, when the object displayed on the display surface is rotated in accordance with the operator's mouse operation.

The display controlling unit 115f performs control to switch and display different types of display images in accordance with the rotation of the object corresponding to the rotating operation received by the rotating operation receiving unit 115e. More specifically, when rotating operations are sequentially received, the display controlling unit 115f refers to the display condition storage unit 114a and sequentially reads the opacity associated with the viewpoint positions corresponding to the rotating operations. Moreover, the display controlling unit 115f sequentially reads different types of display images corresponding to the viewpoint positions from the display image storage unit 114d, superimposes the different types of display images in accordance with the read-out opacity, and sequentially displays the display image that is superimposed on the displaying unit 112.

Figure 12:
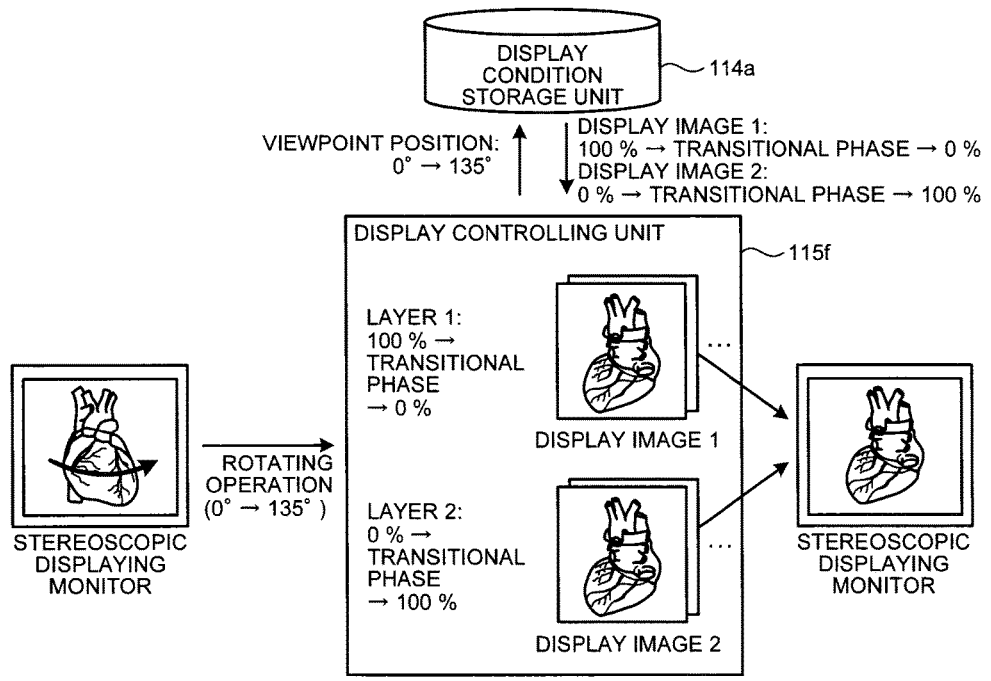
FIG. 12 is a diagram for explaining display control according to the first embodiment.

FIG. 12 is a diagram for explaining the display control according to the first embodiment. As illustrated in FIG. 12, for example, when rotating operations of 'rotating the object from 0° to 135°' are sequentially received from the rotating operation receiving unit 115e, the display controlling unit 115f refers to the display condition storage unit 114a and sequentially reads the opacity associated with the viewpoint positions '0° to 135°'. For example, the display controlling unit 115f sequentially reads, as the opacity associated with the viewpoint positions '0° to 135°', '100%→transitional phase→0%' for the 'display image 1' and '0%→transitional phase→100%' for the 'display image 2'.

Furthermore, the display controlling unit 115f sequentially reads the 'display images 1' and the 'display images 2' corresponding to the viewpoint positions from the display image storage unit 114d (not shown in FIG. 12), superimposes the 'display images 1' and the 'display images 2' in accordance with the read-out opacity, and sequentially displays the display image that is superimposed onto the displaying unit 112. For example, the display controlling unit 115f sequentially adjusts the opacity of the 'display images 1' that serve as the layer 1 to become '100%→transitional phase→0%', and the opacity of the 'display images 2' that serve as the layer 2 to become '0%→transitional phase→100%', superimposes the 'display images 1' and the 'display images 2' whose opacity has been adjusted, and sequentially displays the display image that is superimposed on the displaying unit 112.

In this manner, the display controlling unit 115f according to the first embodiment realizes the method of displaying different types of display images having different reconstruction conditions and correction conditions, while switching the different types of display images in accordance with the rotation of the object. The meaning of switching and displaying is explained here. As described above, the volume data is three-dimensional medical image data. Thus, in general, an object rendered in the volume data is three-dimensional. When a three-dimensional object is displayed and rotated on the display surface of the displaying unit 112, regions of the object displayed on the display surface differ in accordance with the rotation angle of the object. For example, if the three-dimensional object is the heart, the coronary artery of the heart is displayed onto the display surface at a certain rotation angle, but at some other rotation angle, the coronary artery may be hidden on the back side and not fully displayed onto the display surface, and therefore other regions may be displayed.

As described above, there are various requests from the observing side regarding the object displayed on the display surface. For example, when the object rendered in the volume data is the heart, a request from the viewer who observes the heart displayed on the display surface may be to "conduct a diagnosis of the coronary artery" or to "have a view without the influence of the stent". For this reason, different display images are generated in response to different requests. If it is considered that such requests correspond to regions of the object, a single object displayed on the display surface can deal with different requests at a time, by the display switching, with which the display images are switched in accordance with the rotation of the object.

In other words, for example, the display controlling unit 115f according to the first embodiment displays a 'display image 1' corresponding to the 'volume data 1' that is generated by use of the reconstruction conditions for evaluating the coronary artery, at a rotation angle at which the coronary artery of the heart is displayed onto the display surface. Furthermore, for example, the display controlling unit 115f according to the first embodiment displays a 'display image 2' corresponding to the 'volume data 2' generated by use of the correction conditions for removing artifacts caused by substances having different absorption amounts, at a rotation angle at which the coronary artery is hidden on the back and not sufficiently displayed on the display surface but other regions are displayed.

Figure 13:
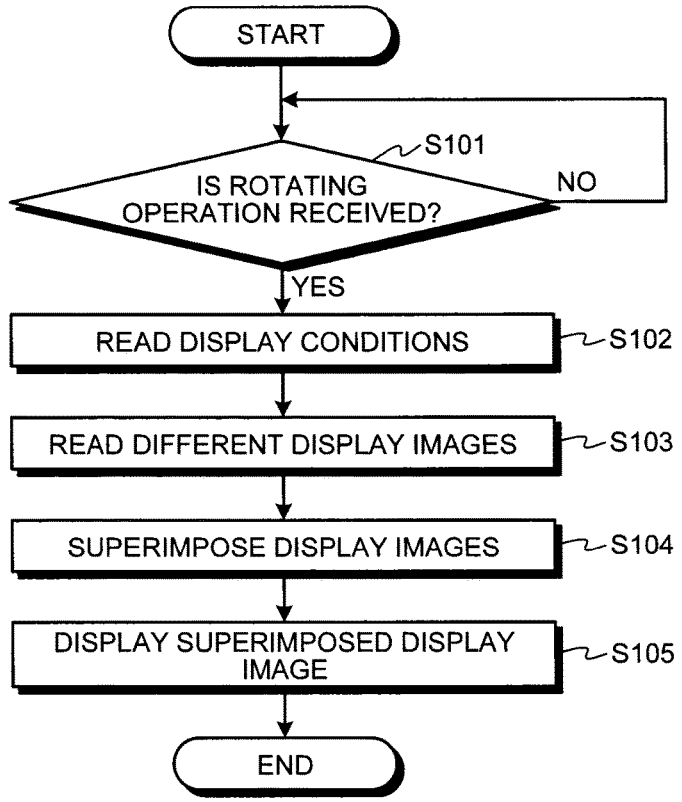
FIG. 13 is a flowchart of the process procedure of the display control according to the first embodiment.

FIG. 13 is a flowchart of the procedure of the display controlling process according to the first embodiment. As shown in FIG. 13, when judging that a rotating operation is received from the rotating operation receiving unit 115e (yes at step S101), the display controlling unit 115f according to the first embodiment refers to the display condition storage unit 114a, and reads out the display conditions corresponding to the rotating operation (step S102).

Then, the display controlling unit 115f reads different types of display images corresponding to the viewpoint position from the display image storage unit 114d (step S103), superimposes the different types of display images in accordance with the display conditions read out at step S102 (step S104), and displays the display image obtained after the superimposition onto the displaying unit 112 (step S105). The display controlling unit 115f sequentially receives the rotating operations from the rotating operation receiving unit 115e, and performs the process of steps S102 through S105 in a continuous manner.

Effects of First Embodiment

As discussed above, according to the first embodiment, different requests can be addressed at a time with a single object displayed on the display surface by the display switching with which display images are switched in accordance with the rotation of the object, and thus medical images can be suitably displayed.

Figure 14:
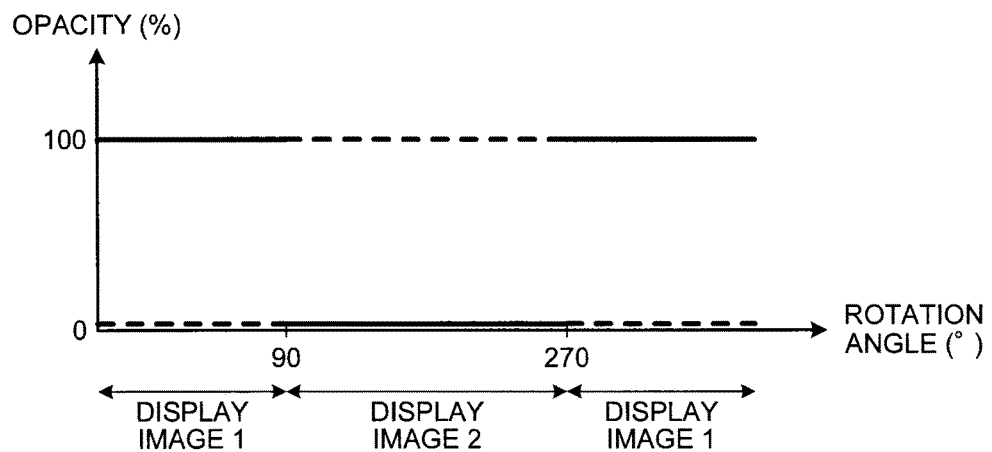
FIG. 14 is a diagram for explaining a modified example of display conditions according to the first embodiment.
Figures 15, 16:
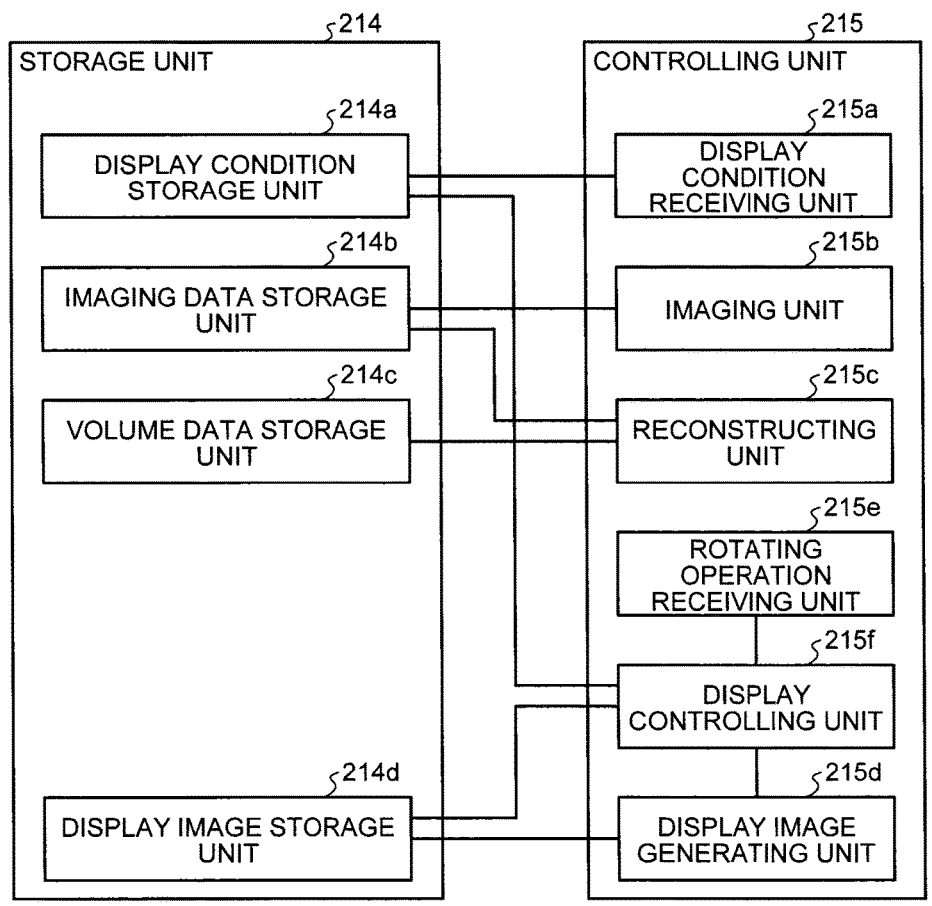
FIG. 15 is a diagram for explaining a modified example of display conditions according to the first embodiment.
FIG. 16 is a diagram for explaining an example structure of the storage unit and the controlling unit according to the second embodiment.

In the above description, as indicated in FIG. 9, transitional phases are provided between the switching times of the 'display image 1' and the 'display image 2', but the embodiment is not limited thereto. FIGS. 14 and 15 are diagrams for explaining a modified example of the display conditions according to the first embodiment. As indicated in FIG. 14, the 'display image 1' and the 'display image 2' may be switched immediately certain rotation angles, without setting a transitional phase between the switching times of the 'display image 1' and the 'display image 2'.

FIG. 15 is presented to explain the display conditions corresponding to FIG. 14 as the display conditions stored in the display condition storage unit 114a storing therein.

Second Embodiment

The second embodiment is explained next. In the same manner as the first embodiment, the medical image diagnosis apparatus 110 according to the second embodiment switches and displays different display images having different reconstruction conditions and correction conditions in accordance with the rotation of the object. However, in addition to merely switching and displaying the display images, the apparatus changes the three-dimensional effect of each display image.

FIG. 16 is a diagram for explaining an example structure of a storage unit 214 and a controlling unit 215 according to the second embodiment. The medical image diagnosis apparatus 110 according to the second embodiment includes the storage unit 214 and the controlling unit 215, in place of the storage unit 114 and the controlling unit 115.

The storage unit 214 and the controlling unit 215 are different from the storage unit 114 and the controlling unit 115 mainly in the following point. According to the first embodiment, the display image generating unit 115d generates the 'display images 1' and the 'display images 2' corresponding to all the rotation angles (viewpoint positions) in advance, and stores the 'display image 1' and the 'display image 2' in the display image storage unit 114d in advance. However, according to the second embodiment, each time the rotating operation receiving unit 115e receives a rotation angle, the 'display image 1' and the 'display image 2' corresponding to the received rotation angle and three-dimensional effect are generated in real time. For this reason, a display image generating unit 215d is brought into connection with a display controlling unit 215f.

The explanation below focuses mainly on the differences with respect to the first embodiment.

Figure 17A:
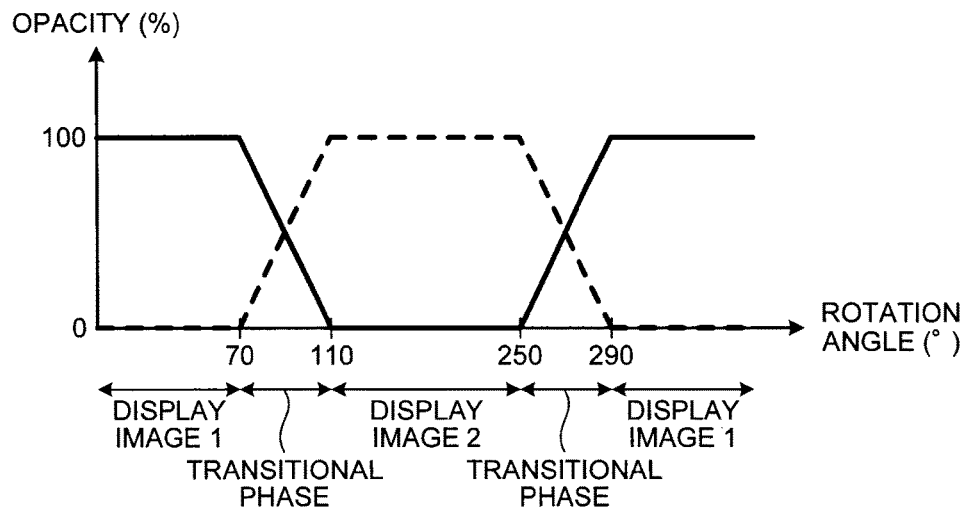
FIG. 17A is a diagram for explaining the display conditions according to the second embodiment.
Figure 17B:
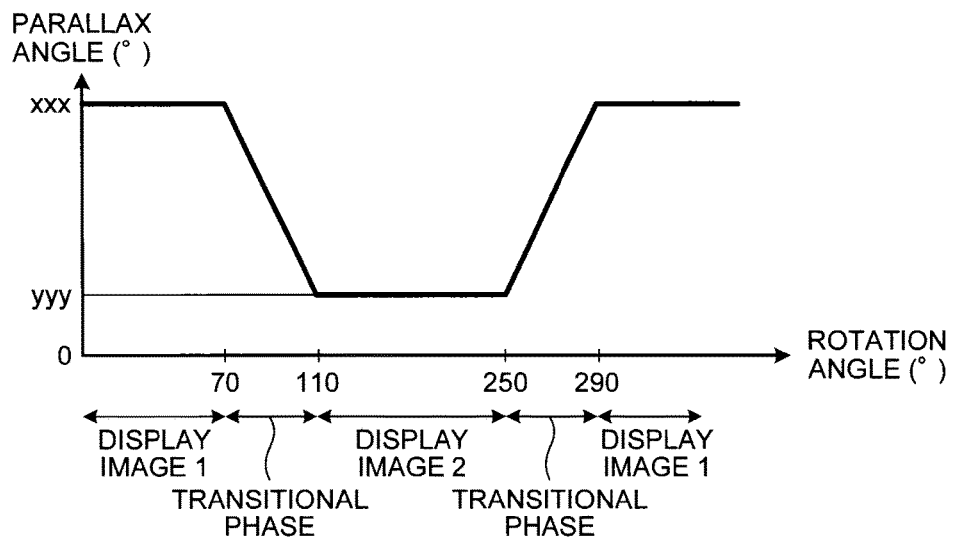
FIG. 17B is a diagram for explaining the display conditions according to the second embodiment.
Figures 18, 19:
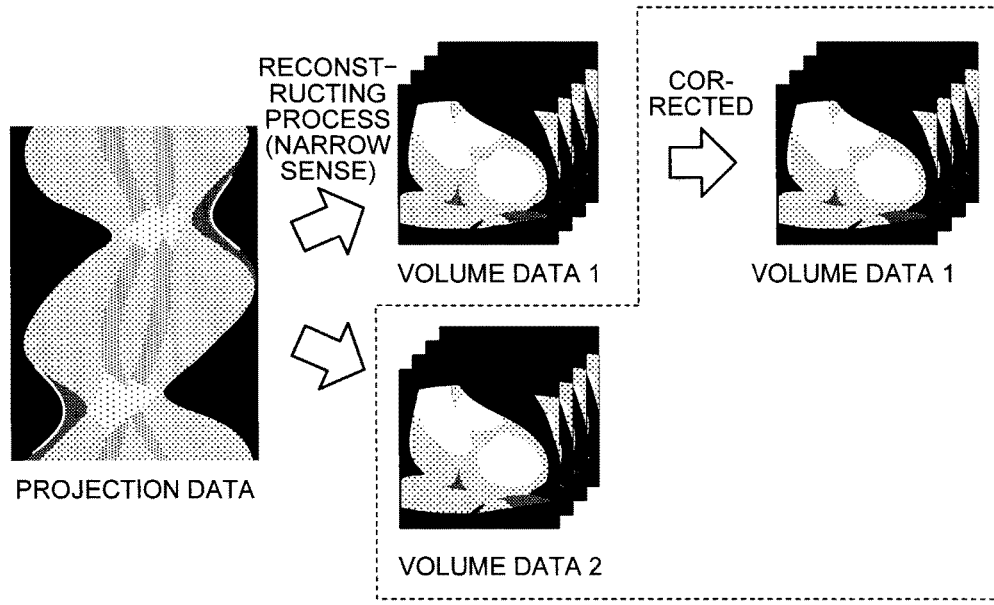
FIG. 18 is a diagram for explaining the display conditions according to the second embodiment.
FIG. 19 is a diagram for explaining the reconstructing process (in a broad sense) according to the second embodiment.

FIGS. 17A, 17B, and 18 are diagrams for explaining display conditions according to the second embodiment. FIGS. 17A and 17B are presented to explain the display conditions in a conceptual manner, while FIG. 18 is presented to explain the display conditions corresponding to FIGS. 17A and 17B, as the display conditions stored in a display condition storage unit 214a.

As indicated in FIGS. 17A, 17B, and 18, the display condition storage unit 214a according to the second embodiment stores therein, as display conditions, not only the correspondence relationship between viewpoint positions and the opacity, but also the correspondence relationship between viewpoint positions and parallax angles. In FIG. 17A, the correspondence relationship between the rotation angles and the opacity is shown, in the same manner as the first embodiment. In FIG. 17A, the solid line represents the opacity of the 'display image 1', while the dashed line represents the opacity of the 'display image 2'.

In FIG. 17B, the vertical axis indicates the "parallax angle" (°) that is one of the rendering conditions used when generating a display image, while the horizontal axis indicates the "rotation angle" (°) of the object displayed on the display surface of the displaying unit 112. Here, the three-dimensional effect of a stereoscopic image is determined by the parallax angle. For example, when comparing the parallax angle designated as "0.5 degrees" and the parallax angle designated as "1 degree", the three-dimensional effect is enhanced more when the parallax angle is designated as "1 degree".

In other words, as indicated in FIG. 17B, for example, when the rotation angle of the object is 'between 0° and 70°', the 'display image 1' is displayed onto the display surface, where the parallax angle is 'xxx °'. Furthermore, when the rotation angle of the object is 'between 110° and 250°', the 'display image 2' is displayed onto the display surface, where the parallax angle is 'yyy °'. Still further, when the rotation angle of the object is 'between 290° and 360°', the 'display image 1' is displayed onto the display surface, where the parallax angle is 'xxx °'. Here, for example, a value is determined for the parallax angle of 'yyy °' in such a manner as to enhance the three-dimensional effect so that detailed portions become more observable. Moreover, for example, a value is determined for the parallax angle of 'xxx °' in such a manner as to show the object planarly.

According to the second embodiment, as indicated in FIGS. 17A and 17B, transitional phases are provided between the switching times of the 'display image 1' and the 'display image 2'. In other words, a transitional phase is determined so that the opacity of the 'display image 1' and the 'display image 2' gradually increases or decreases, and eventually their opacity relationship is reversed. Furthermore, the parallax angle is also determined so that it gradually increases or decreases.

A reconstructing unit 215c according to the second embodiment reads the imaging data from an imaging data storage unit 214b, and performs the reconstructing process onto the read-out imaging data to generate volume data. Furthermore, the reconstructing unit 215c stores the generated volume data into a volume data storage unit 214c.

Here, the reconstructing unit 215c according to the second embodiment performs the reconstructing process (broad sense) by using reconstruction conditions for observing the mediastinum and also the reconstructing process (broad sense) by using correction conditions for optimizing the noise level to the mediastinum, and thereby generates the 'volume data 1'. Moreover, the reconstructing unit 215c performs the reconstructing process (broad sense) by using reconstruction conditions for observing the periphery and thereby generates the 'volume data 2'.

FIG. 19 is a diagram for explaining the reconstructing process (broad sense) according to the second embodiment. As illustrated in FIG. 19, the reconstructing unit 215c according to the second embodiment generates different types of 'volume data 1' and 'volume data 2' having different reconstruction conditions and correction conditions from a single piece of 'projection data'. In addition, the 'volume data 1' is subjected to the reconstructing process (narrow sense) and further to the correcting process, but the 'volume data 2' is subjected only to the reconstructing process (narrow sense).

When a rotating operation receiving unit 215e sequentially receives the rotating operations, the display controlling unit 215f according to the second embodiment refers to the display condition storage unit 214a and sequentially reads the opacity and the parallax angle associated with the viewpoint position corresponding to the rotating operation. Further, the display controlling unit 215f sequentially sends instructions to the display image generating unit 215d to generate different display images corresponding to the viewpoint positions in accordance with the read-out parallax angles. The display image generating unit 215d refers to the volume data storage unit 214c, and sequentially generates display images in accordance with the instructions received from the display controlling unit 215f. Then, when receiving the display images from the display image generating unit 215d, the display controlling unit 215f superimposes these display images in accordance with the read-out opacity, and sequentially displays the display image that is superimposed onto the displaying unit 112.

Figure 20:
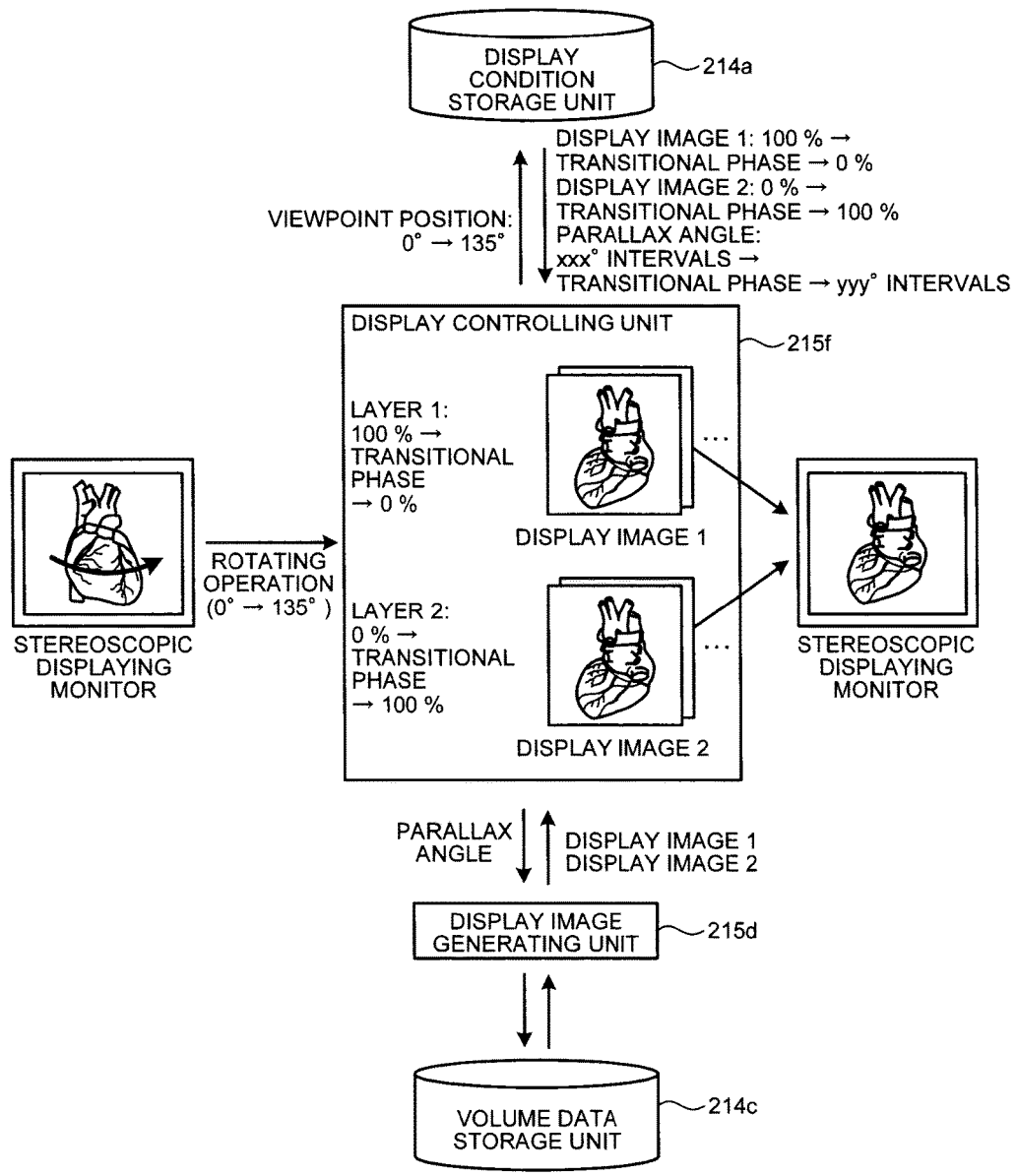
FIG. 20 is a diagram for explaining the display control according to the second embodiment.

FIG. 20 is a diagram for explaining the display control according to the second embodiment. As indicated in FIG. 20, for example, when sequentially receiving rotating operations of 'rotating the object from 0° to 135° from the rotating operation receiving unit 215e, the display controlling unit 215f refers to the display condition storage unit 214a, and sequentially reads the opacity and the parallax angles associated with the viewpoint positions 'between 0° and 135°'. For example, the display controlling unit 215f sequentially reads '100%→transitional phase→0%' for the 'display image 1' and '0%→transitional phase→100%' for the 'display image 2', as the opacity associated with the viewpoint positions 'between 0° and 135°'. Moreover, for example, the display controlling unit 215f sequentially reads 'xxx °→transitional phase→yyy °' as the parallax angles associated with the viewpoint positions 'between 0° and 135°'.

Furthermore, the display controlling unit 215f sequentially sends instructions to the display image generating unit 215d to generate the 'display images 1' and the 'display images 2' corresponding to the viewpoint positions, in accordance with the read-out parallax angles. The display image generating unit 215d refers to the volume data storage unit 214c, and sequentially generates the 'display images 1' and the 'display images 2' in accordance with the instructions received from the display controlling unit 215f. Then, when receiving the display images from the display image generating unit 215d, the display controlling unit 215f superimposes the 'display image 1' and the 'display image 2' in accordance with the read-out opacity, and sequentially displays the display image that is superimposed onto the displaying unit 112. For example, the display controlling unit 115f sequentially adjusts the opacity of the 'display image 1' that serves as the layer 1 to become '100%→transitional phase→0%' and the opacity of the 'display image 2' that serves as the layer 2 to become '0%→transitional phase→100%', superimposes the 'display image 1' and the 'display image 2' whose opacity has been adjusted, and sequentially displays the display image that is superimposed onto the displaying unit 112.

In this manner, the display controlling unit 215f according to the second embodiment realizes the method of displaying different display images having different reconstruction conditions and correction conditions, while switching the display images in accordance with the rotation of the object and also changing the three-dimensional effect. The meaning of the switching display is explained here. As discussed above, when a stereoscopic object is displayed and rotated on the display surface of the displaying unit 112, the region of the object displayed onto the display surface varies depending on the rotation angle of the object. For example, if the stereoscopic object that is the lungs is displayed at a certain rotation angle, the mediastinum of the lungs is displayed onto the display surface. When it is displayed at another rotation angle, the mediastinum of the lungs may be hidden on the back side and not sufficiently be shown on the display surface, and only the periphery of the lungs may be shown.

As discussed above, there are various requests from the viewer who observes the object displayed on the display surface. For example, when the object rendered in the volume data is the lungs, there may be a request to "observe the entire lungs with the mediastinum positioned at the center" or to "observe the periphery in detail" from the viewer who observes the lungs displayed on the display surface. Thus, multiple display images are generated in response to these requests. If these requests are related to the regions of the object, the different requests can be addressed at a time with a single object displayed on the display surface, by display switching with which the display images are switched in accordance with the rotation of the object.

In other words, for example, the display controlling unit 215f according to the second embodiment displays a 'display image 1' corresponding to the 'volume data 1' that is generated by use of the reconstruction conditions for observing the mediastinum and the correction conditions for optimizing the noise level for the mediastinum, at a rotation angle at which the mediastinum of the lungs is displayed onto the display surface. Moreover, for example, the display controlling unit 215f according to the second embodiment displays a 'display image 2' corresponding to the 'volume data 2' that is generated by use of the reconstruction conditions for observing the periphery, at a rotation angle at which the mediastinum of the lungs is hidden on the back side and not sufficiently shown on the display surface but the periphery of the lungs is displayed thereon.

Furthermore, for example, the display controlling unit 215f according to the second embodiment makes adjustments in such a manner as to enhance the three-dimensional effect at a rotation angle at which the periphery of the lungs are displayed, and thereby displays the 'display image 2'.

According to the second embodiment, an example of adjusting the three-dimensional effect as a display condition has been explained, but any other parameter can be adjusted as long as the parameter can be used as a display condition, and, for example, the enlargement/reduction ratio may be adjusted.

Figures 21, 22:
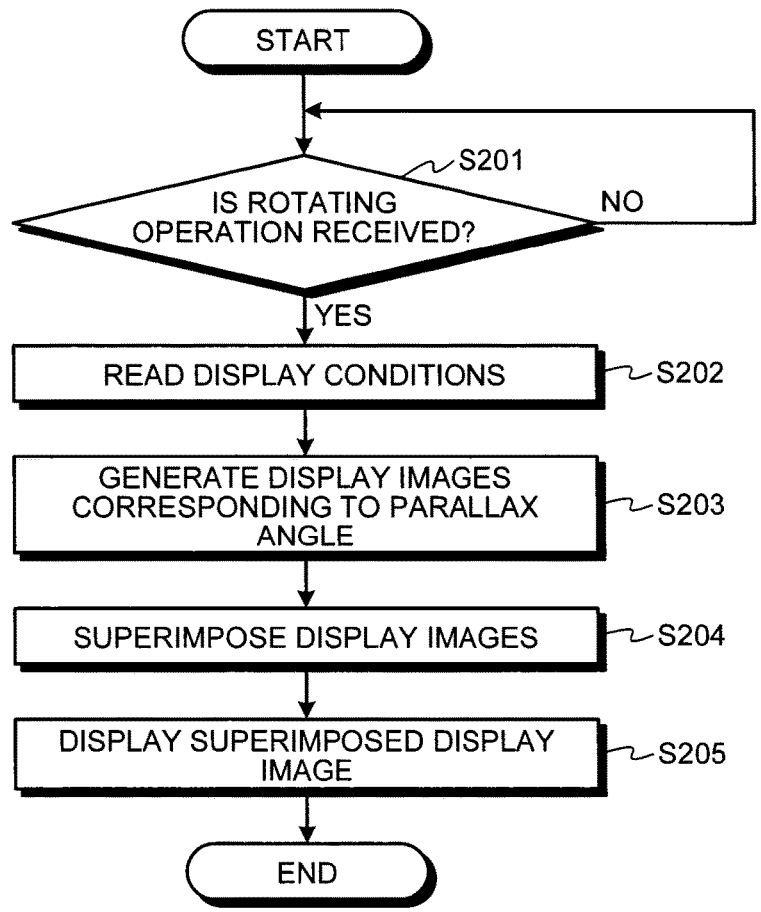
FIG. 21 is a flowchart of the process procedure of the display control according to the second embodiment.
FIG. 22 is a diagram for explaining the display conditions according to another embodiment.

FIG. 21 is a flowchart of the procedure of the process of the display control according to the second embodiment. As indicated in FIG. 21, when judging that a rotating operation is received from the rotating operation receiving unit 215e (yes at step S201), the display controlling unit 215f according to the second embodiment refers to the display condition storage unit 214a, and reads the display conditions corresponding to the rotating operation (step S202).

Then, the display controlling unit 215f performs control so that the display image generating unit 215d generates each of the display images corresponding to each of the parallax angles (step S203). Thereafter, the display controlling unit 215f superimposes the display images in accordance with the display conditions that are read out at step S202 (step S204), and displays the display image that is superimposed on the displaying unit 112 (step S205). The display controlling unit 215f sequentially receives the rotating operations from the rotating operation receiving unit 215e, and repeats the process of steps S202 through S205.

Effects of Second Embodiment

As discussed above, according to the second embodiment, the display images are displayed while making changes to the three-dimensional effect in addition to switching display images in accordance with the rotation of the object, and therefore the medical image can be more suitably displayed.

Other Embodiments

Other embodiments are explained below.

According to the above embodiments, a technique of generating different types of display images from different types of volume data that is generated by performing different imaging processes onto the imaging data has been explained. The embodiment is not limited thereto, however. The display images switched in accordance with the rotation of the object are not limited to the ones generated from the different types of volume data having different reconstruction conditions and correction conditions, but may be the ones generated from the same volume data. For example, the medical image diagnosis apparatus generates, from a single piece of volume data, a display image on which graphs and scales are superimposed and a display image on which graphs and scales are not superimposed, and displays these display images while switching these display images in accordance with the rotation of the object.

Furthermore, according to the above embodiments, images subjected to the volume rendering process have been explained as display images, but the embodiments are not limited thereto. For example, the display image generating unit may be configured to analyze a piece of volume data by a conventional automatic diagnosis technique and generate different types of analysis result images (e.g., different kinds of computer aided diagnosis (CAD) images and different kinds of perfusion maps) and the like, as display images. In such a case, the display controlling unit also displays the different types of analysis result images while switching the different types of analysis result images in accordance with the rotation of the object.

Moreover, according to the above embodiments, an example of continuously switching the viewpoint positions around the target object, but the embodiments are not limited thereto. The viewpoint positions may be switched in a discontinuous manner. In other words, in a similar manner to the first and second embodiments, the medical image diagnosis apparatus superimposes and displays different display images in accordance with the display condition corresponding to each viewpoint position, while sequentially switching among distant viewpoint positions.

For example, the medical image diagnosis apparatus stores, as viewpoint positions for displaying the display images, multiple fixed viewpoint positions in the display condition storage unit. When the display control of the display images is initiated, the medical image diagnosis apparatus reads a fixed viewpoint position and the opacity stored in the display condition storage unit, also reads different display images corresponding to the viewpoint position from the display image storage unit, superimposes the different display images in accordance with the read-out opacity, and displays the display image that is superimposed onto the displaying unit. Moreover, for example, when receiving a viewpoint position switching operation from the operator, the medical image diagnosis apparatus reads the next viewpoint position and the opacity stored in the display condition storage unit, also reads different display images corresponding to this viewpoint position from the display image storage unit, superimposes the different display images in accordance with the read-out opacity, and displays the display image that is superimposed onto the displaying unit.

FIG. 22 is a diagram for explaining the display conditions according to another embodiment. For example, as illustrated in FIG. 22, the medical image diagnosis apparatus stores therein a table in which the fixed viewpoint positions and the opacity are associated, with respect to multiple viewpoint positions. In the example shown in FIG. 22, when the display control of display images is initiated, the medical image diagnosis apparatus reads a viewpoint position and the opacity stored in the display condition storage unit. First, the medical image diagnosis apparatus reads a 'display image 1' and a 'display image 2' corresponding to a viewpoint position '35°' from the display image storage unit, superimposes the 'display image 1' and the 'display image 2' corresponding to a viewpoint position '35°' in accordance with the read-out opacity, and displays the display image that is superimposed on the displaying unit. Then, the 'display image 1' is displayed on the displaying unit. Moreover, for example, when receiving a viewpoint position switching operation from the operator, the medical image diagnosis apparatus reads again the viewpoint position and the opacity stored in the display condition storage unit, and this time, reads a 'display image 1' and a 'display image 2' corresponding to a viewpoint position '210°' from the display image storage unit, superimposes the 'display image 1' and the 'display image 2' corresponding to a viewpoint position '210°' in accordance with the read-out opacity, and displays the display image that is superimposed on the displaying unit. Then, the 'display image 2' is presented on the displaying unit. In this manner, every time that a viewpoint position switching operation is received from the operator, the medical image diagnosis apparatus switches the display images.

For example, a situation in which a doctor checks a display image to determine the course of surgery on the head is considered. The head that is displayed may not need to be rotated. This is because, for example, if the position that is to be opened is limited to the vertex or temporal region to a certain extent, a display image is sufficient enough as long as it makes this limited position viewable. If this is the case, the medical image diagnosis apparatus stores therein, for example, a table in which the viewpoint positions and the opacity are associated with respect to multiple viewpoint positions at which the to-be-opened position can be viewed, and switches the display images each time the viewpoint position switching operation is received from the operator.

Moreover, according to the above embodiments, the examples of the rotating operation and the viewpoint position switching operation that are received from the operator have been explained, but the embodiments are not limited thereto. The viewpoint position may be automatically switched. In other words, in the same manner as the first and second embodiments, the medical image diagnosis apparatus superimposes and displays different display images in accordance with the display conditions corresponding to the viewpoint position, while automatically switching the viewpoint position.

For example, the medical image diagnosis apparatus stores the display conditions for switching the viewpoint position with time, into the display condition storage unit. When the display control of display images is initiated, the medical image diagnosis apparatus sequentially reads the viewpoint positions and opacity stored in the display condition storage unit, with time. Then, the medical image diagnosis apparatus sequentially reads different display images corresponding to the viewpoint positions from the display image storage unit, superimposes the different display images in accordance with the read-out opacity, and displays the display image that is superimposed onto the displaying unit.

Figures 23, 24:
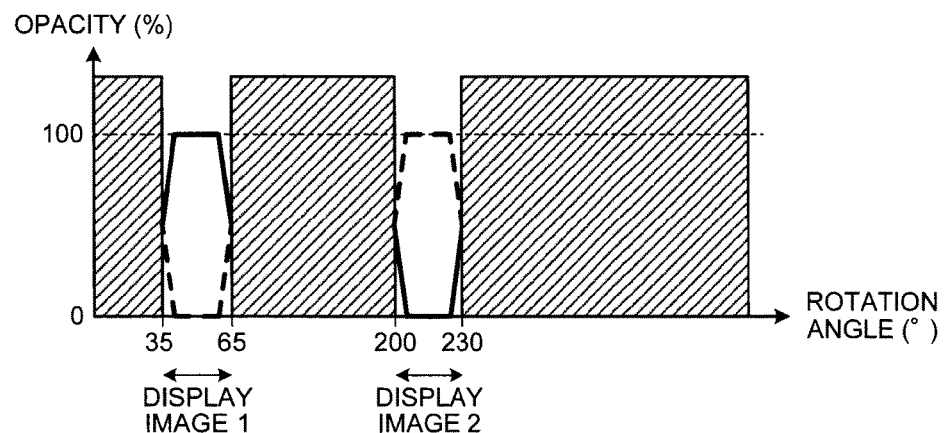
FIG. 23 is a diagram for explaining the display conditions according to another embodiment.
FIG. 24 is a diagram for explaining the display conditions according to another embodiment.

FIGS. 23 to 25 are diagrams for explaining display conditions according to another embodiment. For example, the medical image diagnosis apparatus stores therein a table in which viewpoint positions, display time lengths, and the opacity are associated with one another as display conditions, as indicated in FIG. 23. In the example indicated in FIG. 23, for example, the viewpoint position is gradually changed from '0° to 70°' in 5 seconds 'between 0 and 5 seconds'. In other words, the example of FIG. 23 shows the object that automatically makes one turn in 25 seconds.

In the example of FIG. 23, when the display control of the display images is initiated, the medical image diagnosis apparatus sequentially reads the viewpoint positions and the opacity stored in the display condition storage unit, with time. For the first five seconds, the apparatus sequentially reads the 'display images 1' and the 'display images 2' corresponding to the viewpoint positions 'between 0° and 70°' from the display image storage unit, superimposes the 'display images 1' and the 'display images 2' in accordance with the read-out opacity, and sequentially displays the display image that is superimposed onto the displaying unit. Then, for the first five seconds, the 'display image 1' is displayed onto the displaying unit. Moreover, for the next 5 seconds, the medical image diagnosis apparatus sequentially reads the 'display images 1' and the 'display images 2' corresponding to the viewpoint positions 'between 70° and 110°' from the display image storage unit, superimposes the 'display images 1' and the 'display images 2' in accordance with the read-out opacity, and sequentially displays the display image that is superimposed onto the displaying unit. Because this falls within a transitional phase, the display image displayed on the displaying unit is switched gradually from the 'display image 1' to the 'display image 2'. In this manner, the medical image diagnosis apparatus switches the display image between the 'display image 1' and the 'display image 2' in 25 seconds during which the object automatically makes one turn.

Moreover, for example, the medical image diagnosis apparatus may switch viewpoint positions within certain sections only, as indicated in FIG. 24. In the example of FIG. 24, the 'display image 1' is displayed in a section between the viewpoint positions of '35° and 65°', while the 'display image 2' is displayed in a section between the viewpoint positions of '200° and 230°'. This example shows two separate sections for automatically continuing to display a display image. In such a situation, for example, the medical image diagnosis apparatus stores therein a table in which the viewpoint positions, the display time lengths, and the opacity are associated with one another as the display conditions, as indicated in FIG. 25.

The embodiments are not limited to the above embodiments, however. Whether to "switch viewpoint positions in a continuous manner" or "switch between separate viewpoint positions in discontinuous manner", whether to "present the display while gradually switching viewpoint positions within a certain section" or "stop at a fixed viewpoint position to present the display", whether to "automatically perform the rotation and the switching of viewpoint positions" or "receive operations from the operator", and the like can be arbitrarily combined in accordance with the operational mode.

In addition, in the explanation of the above embodiment, the medical image diagnosis apparatus 110 receives the settings of the display conditions, generates display images, and controls the display thereof. The embodiment is not limited thereto, however. For example, the workstation 130 or the terminal device 140 may be provided with functions equivalent to the controlling unit 115 and the rendering processing unit 116, or functions equivalent to the controlling unit 215. If this is the case, the workstation 130 or the terminal device 140 receive the settings of the display conditions, generates display images, and controls the display of the images. Moreover, the settings of the display conditions, the generation of the display images, and the control of the display may be performed by different devices.

For example, the medical image diagnosis apparatus 110 and the workstation 130, or the terminal device 140 may include a set of display conditions and display images in its own storage unit, or send the set of display conditions and the display images to the image archiving device 120 to store. The device that obtains the set of display conditions and display images can reproduce the display images in accordance with the display conditions.

Furthermore, in the explanation of the above embodiments, the display condition receiving unit receives the input of the display conditions at the time of planning for imaging. The embodiments are not limited thereto, however. For example, the display condition receiving unit may receive the input of display conditions in an ex-post manner. In other words, the operator rotates the object displayed on the stereoscopic displaying monitor, and at the same time, inputs display conditions such as the opacity and the three-dimensional effect onto a display condition receiving screen displayed on a separate window, for example. Then, the display condition receiving unit stores therein the input display conditions, enters the input display conditions together with the display images in its own storage unit, or sends the input display conditions together with the display images to the image archiving device 120, for example, to enter. The display conditions may be received at the time of planning for imaging, and then any change to the display conditions may be received in an ex-post manner.

Figure 26:
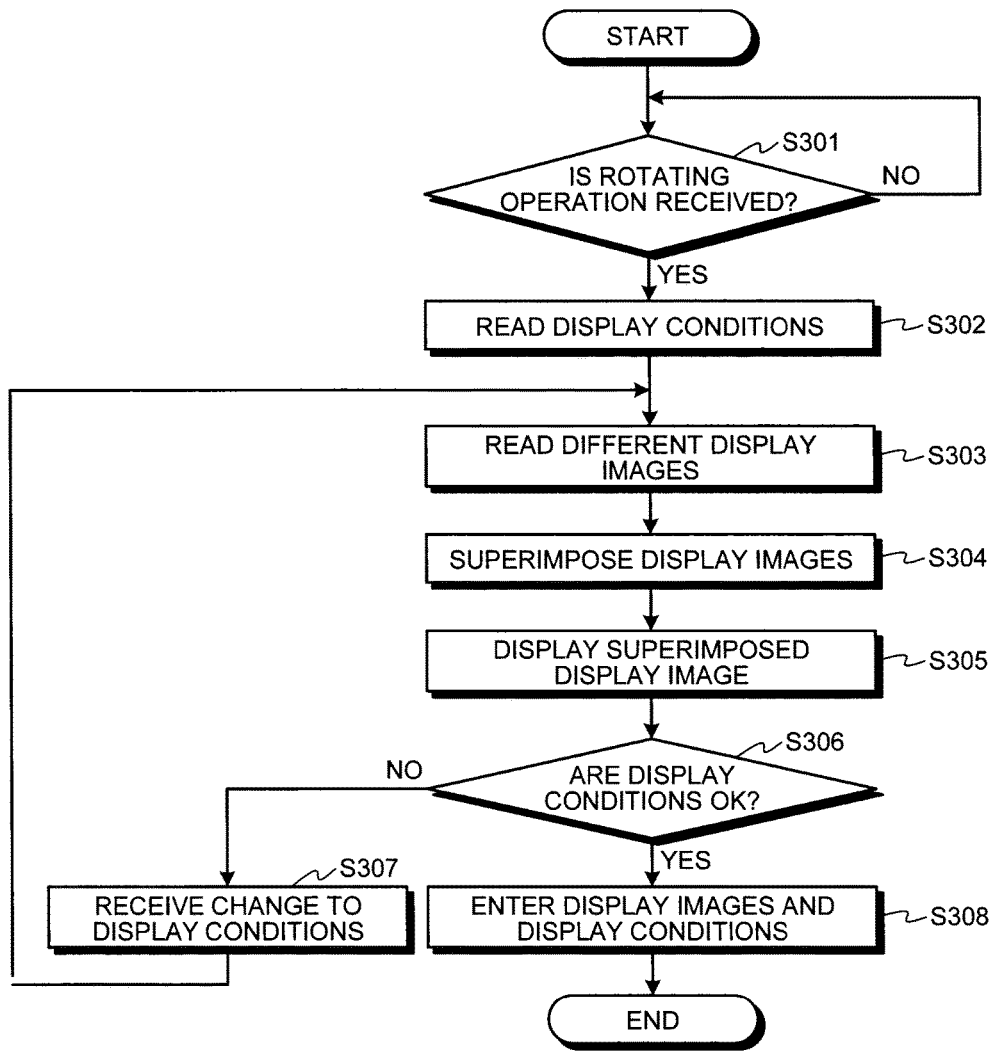
FIG. 26 is a flowchart of the process procedure of the display control according to another embodiment.

FIG. 26 is a flowchart of the procedure of the display control process according to another embodiment. Steps S301 to S305 of FIG. 26 are the same as steps S101 to S105 explained in the first embodiment. Moreover, step S301 to S305 may be replaced with steps S201 to S205 explained in the second embodiment. Furthermore, in the following description, an example of the medical image diagnosis apparatus that receives changes to the display conditions is explained, but the embodiment is not limited thereto. For example, the terminal device 140 may obtain a set of display images and display conditions from the image archiving device 120, and receive a change to the display conditions while displaying the display images, when the operator conducts an operation.

As indicated in FIG. 26, when judging that a rotating operation (or a viewpoint position switching operation) is received (yes at step S301), the medical image diagnosis apparatus reads display conditions corresponding to this operation (step S302). Then, the medical image diagnosis apparatus reads different display images corresponding to the viewpoint position from the display image storage unit (step S303), superimposes the different display images in accordance with the display conditions read out at step S302 (step S304), and displays the superimposed display images (step S305).

Here, as indicated in FIG. 26, the medical image diagnosis apparatus prompts the operator to confirm whether the display conditions of the display images displayed at step S305 should be finalized (step S306). For example, the medical image diagnosis apparatus displays buttons, 'OK with display condition' and 'change display condition', and judges that the display conditions are finalized when receiving a press of the 'OK with display condition' button (yes at step S306). On the other hand, when receiving a press of the 'change display condition' button, the medical image diagnosis apparatus judges that the display conditions are not finalized and that the display conditions are to be changed (no at step S306).

When judging that the display conditions are to be changed (no at step S306), the medical image diagnosis apparatus displays a screen for receiving a change to the display conditions in a separate window, for example, and receives an input of display conditions such as the opacity and the three-dimensional effect (step S307).

Thereafter, returning to step S303, if the viewpoint position is changed, the medical image diagnosis apparatus reads display images corresponding to the new viewpoint position from the display image storage unit (step S303), superimposes the display images in accordance with the display conditions that are changed at step S307 (step S304), and displays the display image that is superimposed in accordance with the changed display conditions (step S305).

Then, the medical image diagnosis apparatus prompts the operator again to confirm whether the display conditions of the display image displayed at step S305 should be finalized (step S306). When judging that the display conditions are finalized (yes at step S306), the medical image diagnosis apparatus brings the display image and the display conditions of the display image displayed at step S305 into association with each other, and stores the display image and the display conditions into the display condition storage unit of the apparatus (step S308).

Further, in the explanation of the above embodiment, the terminal device 140 displays medical images or the like that are obtained from the image archiving device 120. The embodiment is not limited thereto, however. For example, the terminal device 140 may be connected directly to the medical image diagnosis apparatus 110.

According to the above embodiment, a nine-viewpoint parallax image has been used as an example in the explanation, but the embodiment is not limited thereto. For example, any arbitrary number of parallactic viewpoints such as two parallactic viewpoints and six parallactic viewpoints may be adopted.

Moreover, according to the above embodiment, superimposing of two display images has been used as an example in the explanation, but the embodiment is not limited thereto. For example, three display images may be superimposed, or any arbitrary number of display images may be superimposed. If three display images are to be superimposed, for example, the opacity of one of the three display images should be determined as '100%', while the opacity of the other two display images should be determined as '0%' within a range of a certain rotation angle. By switching the display conditions among the three display images, the three display images can be switched and displayed.

Furthermore, in the explanation of the above embodiment, the display images are a group of parallax image set, assuming that the displaying unit is a stereoscopic displaying monitor. The embodiment is not limited thereto, however. For example, the displaying unit may be a two-dimensional monitor that displays ordinary two-dimensional images. In other words, the display image generating unit may generate images to be displayed on an ordinary two-dimensional monitor as the multiple display images. In such a case also, the display controlling unit performs control so that the display images can be switched and displayed in accordance with the rotation of the object displayed on the display surface. The display image generating unit may generate "different types" of display images from "different types" of volume data that is generated by performing different types of image processing onto the imaging data of a certain object, generate "different types" of display images from the "same" volume data, or generate "different types" of display images from "different types" of volume data that is generated by performing imaging processing onto "different types" of imaging data of an object as described later. In other words, according to any embodiment, the display controlling unit can generate images to be displayed on an ordinary two-dimensional monitor as different types of display images.

Still further, an X-ray CT apparatus has been used as an example of the medical image diagnosis apparatus in the explanation of the above embodiment, but the embodiment is not limited thereto. For example, the medical image diagnosis apparatus may generate different types of display images from different types of volume data having different time phases (for example, different types of volume data with or without a contrast agent, and different types of volume data from different examination times), and switch and display these display images. If this is the case, the medical image diagnosis apparatus is not limited to an X-ray CT apparatus, but it may be equally applied to an X-ray diagnosis apparatus, an MRI apparatus, an ultrasound diagnosis apparatus, a SPECT apparatus, a PET apparatus, a SPECT-CT apparatus, a PET-CT apparatus, and the like.

Furthermore, when the medical image diagnosis apparatus is an MRI apparatus, for example, it may generate different types of volume data from different types of imaging data collected with different pulse sequences, generate different types of display images from the different types of volume data, and switch and display these display images. For example, the MRI apparatus may generate different types of volume data from different types of imaging data collected with a pulse sequence for collecting a T1 weighted image and a pulse sequence for collecting a T2 weighted image, and generate different types of display images from the different types of volume data.

Moreover, when the apparatus is an MRI apparatus, it may generate, for example, different types of display images from the volume data collected and generated by phase contrast method, and switch and display these display images. The phase contrast method is an imaging method for creating images of the bloodstream from the spin phase information, and the imaging data collected by phase contrast method includes the blood flow rate information. Here, the direction of the bloodstream of the target object varies in accordance with the switching of the viewpoint position (for example, the bloodstream displayed as flowing in a direction from the back to the front with respect to the display surface changes to a bloodstream that flows from left to right when the target object is rotated 90°). For this reason, a display image obtained from the imaging of the bloodstream also varies in accordance with the switching of the viewpoint position. Thus, in such a situation, for example, each time that the viewpoint position is switched, the MRI apparatus should calculate the blood flow rate information in relation to the new viewpoint position and generate a new display image by use of the newly calculated flow rate information. If multiple items of imaging data are collected, the MRI apparatus may generate multiple display images by use of the multiple items of imaging data. The same technique should be applied to the imaging data collected by any other imaging method for imaging the perfusion.

Others

The structural components of each apparatus illustrated in the drawings are functional and conceptual ones, and therefore they do not have to be physically put into the structure as illustrated. In other words, distribution and integration of each apparatus is not limited to the illustrated pattern, and the entire apparatus or part of it may be configured to be functionally or physically distributed or integrated in arbitrary units in accordance with various loads and usages. Furthermore, the entire processing functions of each apparatus or any part of them may be realized by the CPU and a program analyzed and executed by the CPU, or realized by hardware wired logic.

Moreover, the image processing method explained in the above embodiments may be realized by executing a prepared image processing program on a computer such as a personal computer and a workstation. Such an image processing program can be distributed by way of a network such as the Internet. Moreover, the program may be stored in a computer-readable recording medium such as a hard disk, a flexible disk (FD), a CD-ROM, an MO, and a DVD, retrieved from the recording medium, and executed by a computer.

With the image processing system and method according to at least one of the embodiments explained above, medical images can be suitably displayed.

Some embodiments of the present invention have been explained, but these embodiments are presented simply as examples and should not limit the scope of the invention. These embodiments may be carried out in various modes, and various kinds of omission, replacement, and modification may be made without departing from the gist of the invention. These embodiments and modifications are included in the scope and gist of the present invention, and also included in the invention described in the claims and its equivalent scope.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system, comprising: processing circuitry configured to generate first volume data by performing image processing onto imaging data of an object collected by a medical image diagnosis apparatus using a reconstruction condition as a first condition, and generate second volume data by performing image processing onto the imaging data using a correction condition as a second condition, generate first parallax image sets from the first volume data and second parallax image sets from the second volume data to three-dimensionally display the object on a display surface of a display, and perform control so that each of display conditions of the first parallax image sets and the second parallax image sets is switched in accordance with a rotation of the object displayed on the display surface which causes a viewpoint to be changed, and so that the first parallax image sets and the second parallax image sets, according to each of the display conditions with respect to each of the parallax image sets being switched, are superimposed and displayed, wherein the display conditions are switched in accordance with opacity of a feature in the image, the opacity being associated with viewpoint positions.

2. The image processing system according to claim 1, wherein the processing circuitry is configured to control superimposing and displaying of the first parallax image sets and the second parallax image sets by adjusting a degree of transparency of each one of the parallax image sets in the group.

3. The image processing system according to claim 2, wherein the processing is circuitry configured to gradually adjust a degree of transparency at a predetermined viewpoint position range with respect to each of the parallax image sets.

4. The image processing system according to claim 1, wherein the processing circuitry is configured to generate the first parallax image sets and the second parallax image sets from different types of three-dimensional medical image data for which at least one of conditions used for reconstruction and for corrections are different from one another.

5. The image processing system according to claim 1, wherein:
the processing circuitry is configured to
further superimpose an information display image that is to display certain information on the display surface of the display, onto each of parallax images included in a parallax image set, and
perform control so that the first parallax image sets and the second parallax image sets onto which the information display image is superimposed are superimposed and displayed.

6. The image processing system according to claim 1, wherein the processing circuitry is configured to perform control so that at least one of a three-dimensional effect and an enlargement/reduction rate of each of the parallax image sets in the group is switched as the display conditions.

7. An image processing method executed by an image processing system, comprising:
generating first volume data by performing image processing onto imaging data of an object collected by a medical image diagnosis apparatus using a reconstruction condition as a first condition, and generating second volume data by performing image processing onto the imaging data using a correction condition as a second condition;
generating first parallax image sets from the first volume data and second parallax image sets from the second volume data to three-dimensionally display the object on a display surface of a display; and
performing control so that each of different display conditions of the first parallax image sets and the second parallax image sets is switched in accordance with a rotation of the object displayed on the display surface which causes a viewpoint to be changed, and so that the first parallax image sets and the second parallax image sets, according to each of the display conditions with respect to each of the parallax image sets being switched, are superimposed and displayed, wherein the display conditions are switched in accordance with opacity of a feature in the image, the opacity being associated with viewpoint positions.

8. An image processing system, comprising:
processing circuitry configured to
generate first parallax image sets using a reconstruction condition as a first condition and second parallax image sets using a correction condition as a second condition to three-dimensionally display an object on a display surface of a display, from three-dimensional medical image data that is generated by performing image processing onto imaging data of the object collected by a medical image diagnosis apparatus, and
perform control so that each of display conditions of the first parallax image sets and the second parallax image sets is switched in accordance with a rotation of the object displayed on the display surface which causes a viewpoint to be changed, and so that the first parallax image sets and the second parallax image sets, according to each of the display conditions with respect to each of the parallax image sets being switched, are superimposed and displayed, wherein the display conditions are switched in accordance with opacity of a feature in the image, the opacity being associated with viewpoint positions.

9. An image processing method executed by an image processing system, comprising:
generating first parallax image sets using a reconstruction condition as a first condition and second parallax image sets using a correction condition as a second condition to three-dimensionally display an object on a display surface of a display, from three-dimensional medical image data that is generated by performing image processing onto imaging data of the object collected by a medical image diagnosis apparatus; and
performing control so that each of display conditions of the first parallax image sets and the second parallax image sets is switched in accordance with a rotation of the object displayed on the display surface which causes a viewpoint to be changed, and so that the first the parallax image sets and the second parallax image sets, according to each of the display conditions with respect to each of the parallax image sets being switched, are superimposed and displayed, wherein the display conditions are switched in accordance with opacity of a feature in the image, the opacity being associated with viewpoint positions.

10. An image processing system, comprising: processing circuitry configured to
generate first volume data by performing image processing onto first imaging data of an object collected by a medical image diagnosis apparatus using a reconstruction condition as a first condition, and generate second volume data by performing image processing onto second imaging data of the object collected by a medical image diagnosis apparatus using a correction condition as a second condition,
generate first parallax image sets from the first volume data and second parallax image sets from the second volume data to three-dimensionally display the object on a display surface of a display, and
perform control so that each of display conditions of the first parallax image sets and the second parallax image sets is switched in accordance with a rotation of the object displayed on the display surface which causes a viewpoint to be changed, and so that the first parallax image sets and the second parallax image sets, according to each of the display conditions with respect to each of the parallax image sets being switched, are superimposed and displayed, wherein the display conditions are switched in accordance with opacity of a feature in the image, the opacity being associated with viewpoint positions.

11. An image processing system, comprising: processing circuitry configured to generate first volume data by performing image processing onto imaging data of an object collected by a medical image diagnosis apparatus using a reconstruction condition as a first condition, and generate second volume data by performing image processing onto the imaging data using a correction condition as a second condition, generate first display images from the first volume data and second display images from the second volume data to display the object on a display surface of a display, and perform control so that each of display conditions of the first display images and the second display images is switched in accordance with a rotation of the object displayed on the display surface which causes a viewpoint to be changed, and so that the first display images and the second display images, according to each of the display conditions with respect to each of the display images being switched, are superimposed and displayed, wherein the display conditions are switched in accordance with opacity of a feature in the image, the opacity being associated with viewpoint positions.

12. An image processing system, comprising:

processing circuitry configured to generate first display images using a reconstruction condition as a first condition and second display images using a correction condition as a second condition to three-dimensionally display an object on a display surface of a display, from three-dimensional medical image data that is generated by performing image processing onto imaging data of the object collected by a medical image diagnosis apparatus, and perform control so that each of display conditions of the first display images and second display images is switched in accordance with a rotation of the object displayed on the display surface which causes a viewpoint to be changed, and so that the first display images and the second display images, according to each of the display conditions with respect to each of the display images being switched, are superimposed and displayed, wherein the display conditions are switched in accordance with opacity of a feature in the image, the opacity being associated with viewpoint positions.

13. An image processing system, comprising:

processing circuitry configured to generate first volume data by performing image processing onto first imaging data of an object collected by a medical image diagnosis apparatus using a reconstruction condition as a first condition, and generate second volume data by performing image processing onto second imaging data of the object collected by a medical image diagnosis apparatus using a correction condition as a second condition, generate first display images from the first volume data and second display images from the second volume data to three-dimensionally display the object on a display surface of a display, and perform control so that each of display conditions of the first display images and the second display images is switched in accordance with a rotation of the object displayed on the display surface which causes a viewpoint to be changed, and so that the first display images and the second display images, according to each of the display conditions with respect to each of the display images being switched, are superimposed and displayed, wherein the display conditions are switched in accordance with opacity of a feature in the image, the opacity being associated with viewpoint positions.

* * * * *